United States Patent
Yamagata et al.

(10) Patent No.: US 8,743,231 B2
(45) Date of Patent: Jun. 3, 2014

(54) ELECTRONIC CAMERA

(75) Inventors: Naoki Yamagata, Shiki (JP); Hiroki Uwai, Yokohama (JP); Toshiharu Matsuda, Souka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/067,753

(22) Filed: Jun. 23, 2011

(65) Prior Publication Data

US 2011/0254970 A1 Oct. 20, 2011

Related U.S. Application Data

(62) Division of application No. 12/219,912, filed on Jul. 30, 2008, now abandoned.

(30) Foreign Application Priority Data

Aug. 6, 2007 (JP) ................................. 2007-204453
Aug. 6, 2007 (JP) ................................. 2007-204456

(51) Int. Cl.
*H04N 5/228* (2006.01)
*H04N 9/73* (2006.01)

(52) U.S. Cl.
USPC .................................... 348/222.1; 348/223.1

(58) Field of Classification Search
USPC ....................................... 348/222.1–234, 244
See application file for complete search history.

(56) References Cited

U.S. PATENT DOCUMENTS

| | | | |
|---|---|---|---|
| 5,930,009 A | 7/1999 | Sato et al. | |
| 5,943,059 A | 8/1999 | Satoh et al. | |
| 6,928,187 B2 * | 8/2005 | Cooper et al. | 382/167 |
| 7,212,234 B2 * | 5/2007 | Sakaguchi et al. | 348/223.1 |
| 7,508,438 B2 | 3/2009 | Okamoto et al. | |
| 7,551,205 B2 | 6/2009 | Kubo et al. | |
| 7,697,040 B2 | 4/2010 | Sorensen et al. | |
| 7,738,011 B2 | 6/2010 | Ito | |
| 7,773,259 B2 * | 8/2010 | Hsu et al. | 358/1.9 |
| 7,839,436 B2 * | 11/2010 | Hamamura | 348/223.1 |
| 7,893,961 B2 | 2/2011 | Shinkai | |

(Continued)

FOREIGN PATENT DOCUMENTS

| | | |
|---|---|---|
| CN | 1649392 A | 8/2005 |
| EP | 1 096 786 A2 | 5/2001 |

(Continued)

OTHER PUBLICATIONS

Apr. 24, 2013 Office Action issued in European Patent Application No. 08161583.3.

(Continued)

*Primary Examiner* — Timothy J Henn
*Assistant Examiner* — Pritham Prabhakher
(74) *Attorney, Agent, or Firm* — Oliff PLC

(57) ABSTRACT

An electronic camera comprises an image processing unit that performs image quality adjustment using a plurality of adjustment parameters, an information acquisition unit that acquires from an external device first image quality adjustment information including a parameter group for use with the image quality adjustment and an image quality adjustment algorithm that applies the parameter group, and a control unit that controls the image processing unit so that it performs image quality adjustment while applying the parameter group included in the first image quality adjustment information that has been acquired to the image quality adjustment algorithm included in the first image quality adjustment information that has been acquired.

7 Claims, 44 Drawing Sheets

(56) References Cited

U.S. PATENT DOCUMENTS

| | | |
|---|---|---|
| 8,089,551 B2 * | 1/2012 | Uehara et al. ............ 348/333.11 |
| 2001/0020978 A1 | 9/2001 | Matsui et al. |
| 2003/0001959 A1 | 1/2003 | Tanaka et al. |
| 2003/0030729 A1 * | 2/2003 | Prentice et al. ............ 348/220.1 |
| 2003/0193598 A1 | 10/2003 | Takemura |
| 2003/0227554 A1 | 12/2003 | Kazami et al. |
| 2004/0057061 A1 | 3/2004 | Bochkarev |
| 2004/0070619 A1 * | 4/2004 | Yoshio et al. ................. 345/764 |
| 2004/0189825 A1 | 9/2004 | Kawashima |
| 2004/0257598 A1 * | 12/2004 | Fujio et al. ..................... 358/1.9 |
| 2005/0108645 A1 * | 5/2005 | Prentice et al. ............... 715/722 |
| 2005/0146734 A1 * | 7/2005 | Stokes et al. ................... 358/1.9 |
| 2005/0162519 A1 | 7/2005 | Suzuki |
| 2006/0044394 A1 | 3/2006 | Read |
| 2006/0221198 A1 | 10/2006 | Fry et al. |
| 2007/0121180 A1 * | 5/2007 | Ogawa .......................... 358/518 |
| 2007/0140579 A1 | 6/2007 | Miyashita |
| 2007/0263095 A1 | 11/2007 | Shinkai |
| 2008/0013135 A1 * | 1/2008 | Hsu et al. ...................... 358/520 |

FOREIGN PATENT DOCUMENTS

| | | | |
|---|---|---|---|
| EP | 1 349 115 A2 | | 1/2003 |
| EP | 1560162 A2 | | 8/2005 |
| JP | A-06-203118 | | 7/1994 |
| JP | A-7-30792 | | 1/1995 |
| JP | A-08-050648 | | 2/1996 |
| JP | A-2001-127978 | | 5/2001 |
| JP | A-2003-032618 | | 1/2003 |
| JP | A-2003-224747 | | 8/2003 |
| JP | A-2003-304484 | | 10/2003 |
| JP | A-2004-015247 | | 1/2004 |
| JP | A-2005-217483 | | 8/2005 |
| JP | A-2006-020298 | | 1/2006 |
| JP | 2006106976 | * | 4/2006 |
| JP | A-2007-019962 | | 1/2007 |
| JP | A-2007-174482 | | 7/2007 |
| WO | WO 96/04749 A1 | | 2/1996 |

OTHER PUBLICATIONS

Bradley; "Color Editor;" *Interactive Image Display for the X Window System*; Dec. 29, 1994; pp. 33-44.

European Search Report dated Jan. 21, 2011 in corresponding European Application No. 10191094.1.

Office Action issued in U.S. Appl. No. 12/219,912, dated Jun. 20, 2012.

Sep. 14, 2011 Office Action issued in U.S. Appl. No. 12/219,912.

Nov. 13, 2012 Office Action issued in Japanese Patent Application No. 2007-204453 (with English Translation).

Jul. 17, 2013 U.S. Office Action issued in U.S. Appl. No. 13/722,634 in the name of Yamagata.

* cited by examiner

FIG.4

| | AREA FOR CHANGED PARAMETERS | AREA FOR STANDARD PARAMETERS | AREA FOR IMAGE QUALITY ADJUSTMENT INFORMATION |
|---|---|---|---|
| STANDARD (SD) | | DEFAULT VALUES FOR SD | IMAGE QUALITY ADJUSTMENT INFORMATION FOR SD |
| NEUTRAL (NL) | | DEFAULT VALUES FOR NL | IMAGE QUALITY ADJUSTMENT INFORMATION FOR NL |
| VIVID (VI) | CHANGED VALUE | DEFAULT VALUES FOR VI | IMAGE QUALITY ADJUSTMENT INFORMATION FOR VI |
| MONOCHROME (MC) | | DEFAULT VALUES FOR MC | IMAGE QUALITY ADJUSTMENT INFORMATION FOR MC |
| ADDED #1 | | DEFAULT VALUES | ADDED IMAGE QUALITY ADJUSTMENT INFORMATION |
| ADDED #2 | | | |
| ADDED #3 | | | |
| ADDED #4 | | | |

| | AREA FOR CHANGED PARAMETERS | AREA FOR STANDARD PARAMETERS | AREA FOR IMAGE QUALITY ADJUSTMENT ID |
|---|---|---|---|
| CUSTOM (C-1) | | | |
| CUSTOM (C-2) | | | |
| CUSTOM (C-3) | CHANGED VALUE | DEFAULT VALUE FOR VI | VI |
| CUSTOM (C-4) | | | |
| CUSTOM (C-5) | CHANGED VALUE | DEFAULT VALUE FOR SD | SD |
| CUSTOM (C-6) | | | |
| CUSTOM (C-7) | | | |
| CUSTOM (C-8) | | | |

FIG. 34

STANDARD
(SD)

| QUICK ADJUST | −2 | −1 | 0 | +1 | +2 |
|---|---|---|---|---|---|
| CONTOUR ACCENTUATION | 1 | 2 | 3 | 4 | 6 |
| CONTRAST | −2 | −1 | 0 | +1 | +2 |
| BRIGHTNESS | 0 | 0 | 0 | 0 | 0 |
| COLOR DEPTH (SATURATION) | −1 | 0 | 0 | +1 | +1 |
| HUE | 0 | 0 | 0 | 0 | 0 |

FIG. 35

| | VIVID (VI) | | | | |
|---|---|---|---|---|---|
| QUICK ADJUST | −2 | −1 | 0 | +1 | +2 |
| CONTOUR ACCENTUATION | 2 | 3 | 4 | 5 | 6 |
| CONTRAST | −1 | −1 | 0 | +1 | +2 |
| BRIGHTNESS | 0 | 0 | 0 | 0 | 0 |
| COLOR DEPTH (SATURATION) | −1 | 0 | 0 | +1 | +1 |
| HUE | 0 | 0 | 0 | 0 | 0 |

ELECTRONIC CAMERA

INCORPORATION BY REFERENCE

This is a Division of application Ser. No. 12/219,912 filed Jul. 30, 2008, which claims the benefit of Japanese Application No. 2007-204453 filed Aug. 6, 2007 and Japanese Application No. 2007-204456 filed Aug. 6, 2007. The disclosure of the prior applications is hereby incorporated by reference herein in their entirety.

BACKGROUND

1. Field of the Invention

The present invention relates to an electronic camera.

2. Description of Related Art

An electronic camera with which it is arranged for the user to be able to select the finished image quality due to image processing is known (refer to Japanese Patent Laying Open Publication 2005-217483). According to Reference #1, a group of setting parameters for each of "white balance setting", "contour accentuation", "tone correction", "color mode" and "saturation setting" is stored in advance in the electronic camera in correspondence to a key word such as "vivid" or the like. Upon selection actuation by the user, the electronic camera reads out the group of parameters corresponding to the key word that has been commanded, and changes the finished image quality of the image by performing "white balance setting", "contour accentuation", "tone correction", "color mode" and "saturation setting" using the parameters that have been read out.

In the prior art, there has been the problem that, if it has been desired to share the parameter information for image quality adjustment with an external device, it has not been possible to do this. Furthermore, the characteristics of the finished image quality have been hard to understand.

SUMMARY

An electronic camera according to a first aspect of the present invention comprises an image processing unit that performs image quality adjustment using a plurality of adjustment parameters, an information acquisition unit that acquires from an external device first image quality adjustment information including a parameter group for use with the image quality adjustment and an image quality adjustment algorithm that applies the parameter group, and a control unit that controls the image processing unit so that it performs image quality adjustment while applying the parameter group included in the first image quality adjustment information that has been acquired to the image quality adjustment algorithm included in the first image quality adjustment information that has been acquired.

According to a second aspect of the present invention, in the electronic camera of the first aspect, it is preferable that the first image quality adjustment information further includes icon information that specifies the image quality adjustment, a title of the image quality adjustment, and information that specifies the characteristics of the image quality adjustment.

It is desirable that an electronic camera according to a third aspect of the present invention, with the electronic camera of the second aspect, further comprises a display device and a display control unit that, if the information acquisition unit has acquired a plurality of the first image quality adjustment information, displays upon the display device a list specifying the plurality of first image quality adjustment information that have been acquired, using at least one of the icon information and the titles of the image quality adjustments.

According to a fourth aspect of the present invention, in the electronic camera of the third aspect, the display control unit can display, upon the display device, information that specifies the characteristics of the image quality adjustment in correspondence with the first image quality adjustment information that has been commanded upon the list.

According to a fifth aspect of the present invention, in the electronic camera of any one of the first through fourth aspects, it may further comprise an information recording unit that records the first image quality adjustment information upon a recording medium.

An electronic camera according to a sixth aspect of the present invention comprises an image processing unit that performs image quality adjustment using a plurality of adjustment parameters, an information acquisition unit that acquires from an external device second image quality adjustment information including a parameter group for use with the image quality adjustment and ID information that specifies an image quality adjustment algorithm that applies the parameter group, and a control unit that controls the image processing unit so that it performs image quality adjustment while applying the parameter group included in the second image quality adjustment information that has been acquired to the image quality adjustment algorithm corresponding to the ID information included in the second image quality adjustment information that has been acquired.

According to a seventh aspect of the present invention, in the electronic camera of the sixth aspect, it may further comprise a notification unit that, if the electronic camera has no image quality adjustment algorithm corresponding to the ID information included in the second image quality adjustment information that has been acquired, notifies that effect.

According to an eighth aspect of the present invention, in the electronic camera of the sixth or seventh aspect, the second image quality adjustment information may include information that specifies a title of the image quality adjustment. It is preferable that this electronic camera further comprises a display device and a display control unit that, if the information acquisition unit has acquired a plurality of the second image quality adjustment information, displays upon the display device a list specifying the plurality of second image quality adjustment information that have been acquired, using the titles of the image quality adjustments.

An electronic camera according to a ninth aspect of the present invention, with any one of the sixth through eighth aspects, may further comprise an information recording unit that records the second image quality adjustment information upon a recording medium.

An electronic camera according to a tenth aspect of the present invention comprises an image processing unit that performs image quality adjustment using a parameter group that consists of plurality of adjustment parameters, a display device, and a display control unit that displays upon the display device a coordinate plane that shows two predetermined parameters among the parameter group set to the image processing unit.

According to an eleventh aspect of the present invention, in the electronic camera of the tenth aspect, it is preferable that the two parameters are a parameter for changing contrast of an image and a parameter for changing saturation of the image, and that the display control unit displays upon the display device a mark that indicates the parameter group on the coordinate plane.

According to a twelfth aspect of the present invention, in the electronic camera of the tenth or eleventh aspect, it is more preferable that, if a plurality of the parameter groups are present, the display control unit displays upon the display device marks that respectively indicate each of the parameter groups on the coordinate plane.

According to a thirteenth aspect of the present invention, in the electronic camera of the twelfth aspect, it is much more preferable that, if a plurality of the marks are overlapped on the coordinate plane, the display control unit displays upon the display device a mark indicating a predetermined parameter group as a priority.

According to a fourteenth aspect of the present invention, in the electronic camera of the thirteenth aspect, the display control unit can display upon the display device a list that specifies the plurality of parameter groups, and can display, as a priority, a mark that indicates a parameter group in a upper position on the list.

According to a fifteenth aspect of the present invention, in the electronic camera of the thirteenth aspect, the display control unit may display upon the display device a list that specifies the plurality of parameter groups, and may display, as a priority, a mark that indicates a parameter group that has been commanded on the list.

According to a sixteenth aspect of the present invention, in the electronic camera of any one of the eleventh through fifteenth aspects, it is preferable that, if at least one of the predetermined two parameters is set automatically, the display control unit displays the mark upon the display device in a different mode than if the parameter is not set automatically.

BRIEF DESCRIPTION OF THE DRAWINGS

FIG. 4 is a figure for explanation of a memory region in which information related to image quality adjustment is stored;
FIG. 34 is a figure showing an example of table data for quick adjustment;
FIG. 35 is a figure showing an example of table data for quick adjustment.

DETAILED DESCRIPTION OF EMBODIMENTS

Figure 1:
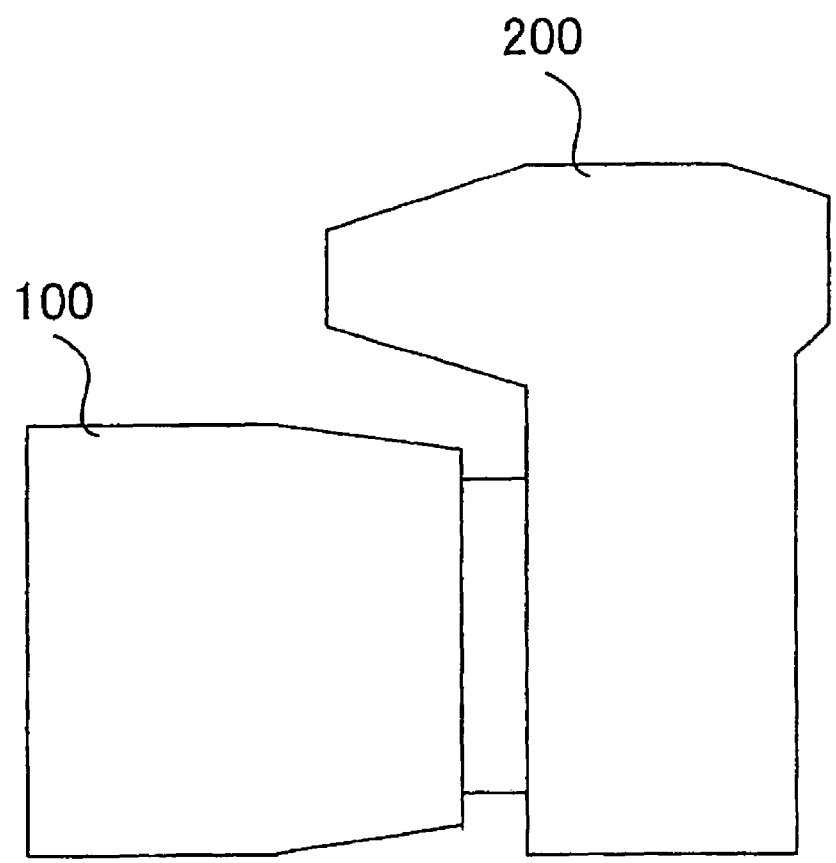
FIG. 1 is a figure for explanation of the structure of the principal portions of an electronic camera according to an embodiment of the present invention.

Preferred embodiments for implementation of the present invention will now be explained with reference to the drawings. FIG. 1 is a figure for explanation of the structure of the principal portions of an electronic camera according to an embodiment of the present invention. In FIG. 1, a lens barrel 100 of a photographic lens is fitted to a camera main body 200, and is built to be detachable.

Figure 2:
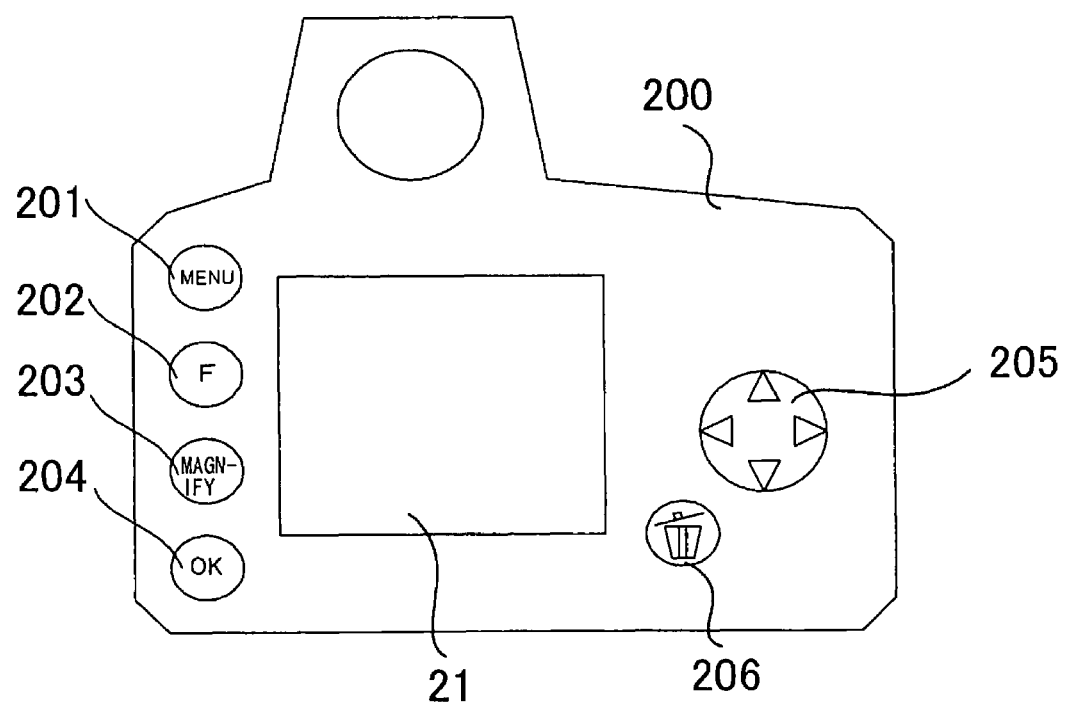
FIG. 2 is a rear view of the camera main body.

FIG. 2 is a rear view of the camera main body 200. In FIG. 2, a liquid crystal monitor 21, a menu button (MENU) 201, a function button (F) 202, a magnify button 203, an execute button (OK), a multi selector 205, and a delete button 206 are provided upon the camera main body 200.

The menu button 201 is an actuation member for displaying an actuation menu screen that will be described hereinafter upon the liquid crystal monitor 21. The function button 202 is an actuation member for providing a predetermined display upon the liquid crystal monitor 21. The magnify button 203 is an actuation member for causing an image or the like to be displayed upon the liquid crystal monitor 21 as magnified. The execute button 204 is an actuation member for executing an item that is selected upon a menu screen. The multi selector 205 is an actuation member for shifting the position of a cursor upon a screen being displayed upon the liquid crystal monitor 21 upwards, downwards, leftwards, and rightwards. And the delete button 206 is an actuation member for deleting data such as an image or the like.

Figure 3:
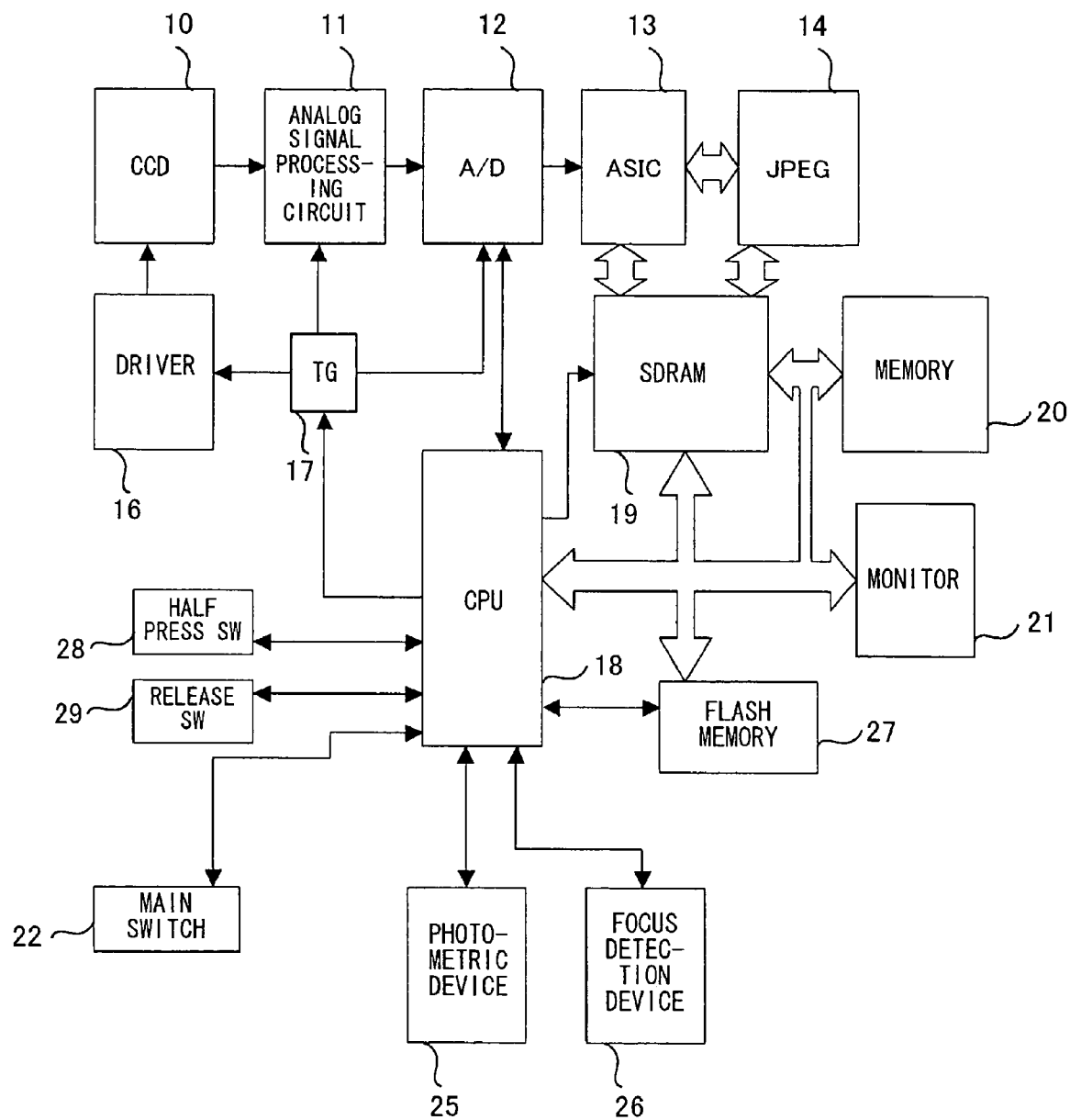
FIG. 3 is a block diagram showing an example of the circuit structure of this electronic camera.

FIG. 3 is a block diagram showing an example of the circuit structure of the electronic camera described above. A CPU 18 consists of a microcomputer or the like. This CPU 18 inputs signals outputted from various blocks of the camera main body 200 and performs predetermined calculations, and outputs control signals based upon the results of these calculations to various blocks.

A main switch 22 outputs an actuation signal according to ON actuation or OFF actuation to the CPU 18. Upon receipt of an ON actuation signal, the CPU 18 starts supply of power from a power supply circuit not shown in the figures to various blocks; and, upon receipt of an OFF actuation signal, it stops supply of power from that power supply circuit to the various blocks.

A timing generator (TG) 17 generates a timing signal upon a command issued from the CPU 18, and supplies this timing signal to each of a driver 16, an analog signal processing circuit 11, and an A/D conversion circuit 12. The driver 16 causes an image sensor 10 to accumulate electric charge, generates a drive signal for sweeping out the accumulated electric charge using the timing signal described above, and supplies this drive signal to the image sensor 10.

The image sensor 10 consists of, for example, a CCD image sensor or the like. This image sensor 10 captures an image of a photographic subject that is imaged by the photographic lens 100 upon its photographic image surface. In other words, it accumulates signal charges according to the brightness of the image of the photographic subject. The image capture process may, for example, be started when, upon receipt of an ON signal from a full press switch 29 that will be described hereinafter, the CPU 18 sends a command to the timing generator (TG) 17.

The analog signal processing circuit 11 includes an AGC circuit and a CDS circuit and the like, and performs analog processing (gain control, noise elimination, and the like) upon the photoelectric conversion signal (i.e. the accumulated electrical charge) that is outputted from the image sensor 10. And the A/D conversion circuit 12 converts this image capture signal, after it has been analog processed, into a digital signal.

A half press switch 28 and the release switch 29 are turned ON and OFF together with operation of a release button (not shown in the figures) by depression actuation, and each of them outputs an actuation signal to the CPU 18. The ON signal from the switch 28 is outputted when the release button (not shown in the figures) is pressed downwards to about half of its normal stroke, and its output is cancelled by this half stroke pressing actuation being released. And the ON signal from the switch 29 is outputted when the release button (not shown in the figures) is pressed downwards to its normal stroke, and its output is cancelled by this normal stroke pressing actuation being released.

The photometric device 25 calculates the luminance of the photographic subject by using the detection signal of a photometric sensor not shown in the figures. And the CPU 18 performs known exposure calculation using the image capture sensitivity that is set, information about the photographic lens 100 that is installed, and the luminance of the photographic subject that has been calculated, and thereby determines a control exposure. The exposure calculation mode is according to the exposure calculation mode set to the camera main body 200. The calculation of the photographic subject luminance may be performed, for example, upon command from the CPU 18 that has received an ON signal from the half press switch 28.

A focus detection device 26 calculates the focus adjustment state (the defocus amount) of the photographic lens 100 using the detection signal of a focus detection sensor not shown in the figures, and calculates a shift amount for an optical system for focus adjustment according to the result of this calculation. Upon receipt of this shift amount information, focus adjustment upon the main photographic subject is performed on the photographic lens 100 side by shifting the focus adjustment optical system forwards and backwards along the direction of the optical axis. This focus detection processing may be performed, for example, upon command from the CPU 18 that has received an ON signal from the half press switch 28.

An image processing circuit 13 performs image processing, and may consist of an ASIC (Application Specific Integrated Circuit) or the like. This image processing circuit 13 performs processing upon the image data after digital conversion, such as contour accentuation processing, γ conversion processing, white balance processing, and the like. A JPEG compression/expansion circuit 14 performs compression processing upon the image data so as to compress it in the JPEG format, and decompression processing to expand image data that has been compressed.

A SDRAM 19 is a working memory that temporarily stores data during the processing performed by the CPU 18, image processing circuit (ASIC) 13, the JPEG compression/expansion circuit 14 and the like. A memory 20 is a non volatile memory such as an EEPROM, a flash memory or the like, and stores operating programs for the camera main body 200 and setting information and the like. The CPU 18 performs generation of display data for causing menu screens and replay images to be displayed upon the liquid crystal monitor 21. The display data that has been generated is primarily stored in the SDRAM 19 and is displayed upon the liquid crystal monitor 21.

A recording medium 27 consists of a data storage member such as, for example, a flash memory card or the like. The CPU 18 can store data for photographic images and the like upon this recording medium 27, and can read out data stored upon the recording medium 27.

Since the electronic camera of this embodiment is endowed with a feature of image quality adjustment setting for the photographic image, in the following, the explanation will center upon this image quality setting operation. FIG. 4 is a figure for explanation of a memory region in which information related to image quality adjustment is stored.

Normal Image Quality Adjustment

This electronic camera is built so as to utilize any one of a plurality of different types of image quality adjustment algorithms. For example, the following four types of image quality adjustment algorithm may be stored in an image quality adjustment information area that is provided within the memory 20 described above.

[1] Standard
[2] Neutral
[3] Vivid
[4] Monochrome

"Standard" is an image quality adjustment algorithm that finishes to a standard image. "Neutral" is an image quality adjustment algorithm that finishes with emphasis being accorded to matching the natural colors of the raw materials. "Vivid" is an image quality adjustment algorithm that finishes to a vivid image. In concrete terms, along with increasing the saturation so as to process red colors and green colors vividly, it increases the contrast so as to obtain a sharp image. And "Monochrome" is an image quality adjustment algorithm that finishes to a black and white image. The image processing circuit 13 performs image quality adjustment processing upon the photographed image by using that image quality adjustment algorithm that has been set (i.e. selected) by actuation upon a menu actuation screen.

Each of these image quality adjustment algorithms is constructed so that a group of a plurality of parameters (hereinafter termed a "parameter group") that are used for image quality adjustment processing can be changed. A parameter group may, for example, include a parameter for adjusting the strength of "contour accentuation", a parameter for adjusting the strength of "contrast", a parameter for adjusting the strength of "brightness", a parameter for adjusting the strength of "saturation" (i.e. color depth), and a parameter for adjusting the "hue".

If actuation to change the parameters is not being performed, the image processing circuit 13 performs image quality adjustment processing upon the photographed image while using a parameter group that has been set in advance for each of the image quality adjustment algorithms (the default values). For example, four of these standard parameter groups may be stored in correspondence to the corresponding image quality adjustment algorithms in an area for standard parameters that is provided within the memory 20 described above.

[1] Default values for "SD"
[2] Default values for "NL"
[3] Default values for "VI"
[4] Default values for "MC"

If parameter change actuation has been performed, the image processing circuit 13 performs the image quality adjustment processing upon the photographed image while using a parameter group after it has been changed. The parameter group that has been changed is stored in an area for changed parameters that is provided within the memory 20 described above, in correspondence with the corresponding image quality adjustment algorithm. In the example of FIG. 4, a parameter group (changed values) that has been changed from a standard parameter group (the default values for "Vivid") is stored in this area for changed parameters.

Adding an Image Quality Adjustment Algorithm

This electronic camera is built so that it is possible to add an image quality adjustment algorithm. As regions for storing added image quality adjustment algorithms, four reserved regions are provided within the image quality adjustment information area described above that is provided within the memory 20. When an image quality adjustment algorithm has been added, that image quality adjustment algorithm is stored in one of the above described reserved regions. Moreover, the standard parameter group that is used in that image quality adjustment algorithm (i.e. its default values) is stored in correspondence with that added image quality adjustment algorithm in the area for standard parameters that is provided within the above described memory 20.

When an image quality adjustment algorithm has been added, this electronic camera can use, as appropriate, any one of the four image quality adjustment algorithms that are used for normal image quality adjustment, and also the image quality adjustment algorithm that has been added. It should be understood that, if the image quality adjustment algorithm that has been added is to be used, the feature that a standard parameter group (i.e. default values) is used if actuation to change the parameters has not been performed, and the feature that the parameter group after it has been changed is used if actuation to change the parameters has been performed, are the same as in the case of one of the four image quality adjustment algorithms that are used for normal image quality adjustment.

Storage of a Parameter Group after it has been Changed

This electronic camera is built so that it is possible to store a parameter group after it has been changed. As regions for housing such stored data there are provided, within the memory 20 described above, custom areas for standard parameters, areas for changed parameters, and areas for image quality adjustment IDs (for example, C 1 through C 8). These custom regions may be provided both within the memory 20 and upon the recording medium 27.

For example, a case will be described in which a parameter group that has been changed from the standard parameter group (i.e. the default values) used in the image quality adjustment algorithm for VI is stored in "C 3", that is a custom region. The parameter group after it has been changed (i.e. its changed values), in other words the changed values that are used as the image quality adjustment information for VI and that are stored in the area for changed parameters of VI, and the default values for VI that are stored in the area for standard parameters, are stored as the default values for "C 3" in its area for standard parameters, and an ID that specifies the image quality adjustment algorithm that is the source for customization (in this example, VI) is stored in its area for image quality adjustment ID. In other words, the ID information "VI" is stored in the area for image quality adjustment ID of "C 3", and the parameter group that was used in the image quality adjustment algorithm for VI when it was registered (i.e. the default values for the custom C 3 upon the base VI) is stored in the area for standard parameters of "C 3". It should be understood that, when parameter change actuation has been performed for a custom setting that is registered, the parameter group that has been changed is stored in the area for changed parameters of that changed custom setting.

With this electronic camera, when a parameter group after change has been stored in a custom region, it is also possible to use this parameter group that has been stored, in addition to the four image quality adjustment algorithms that are used in normal image quality adjustment and the image quality adjustment algorithm that has been added. It should be understood that, when using a parameter group that has been stored, the image quality adjustment algorithm to which that parameter group is applied is the image quality adjustment algorithm that is denoted by the image quality adjustment ID.

Figure 5:
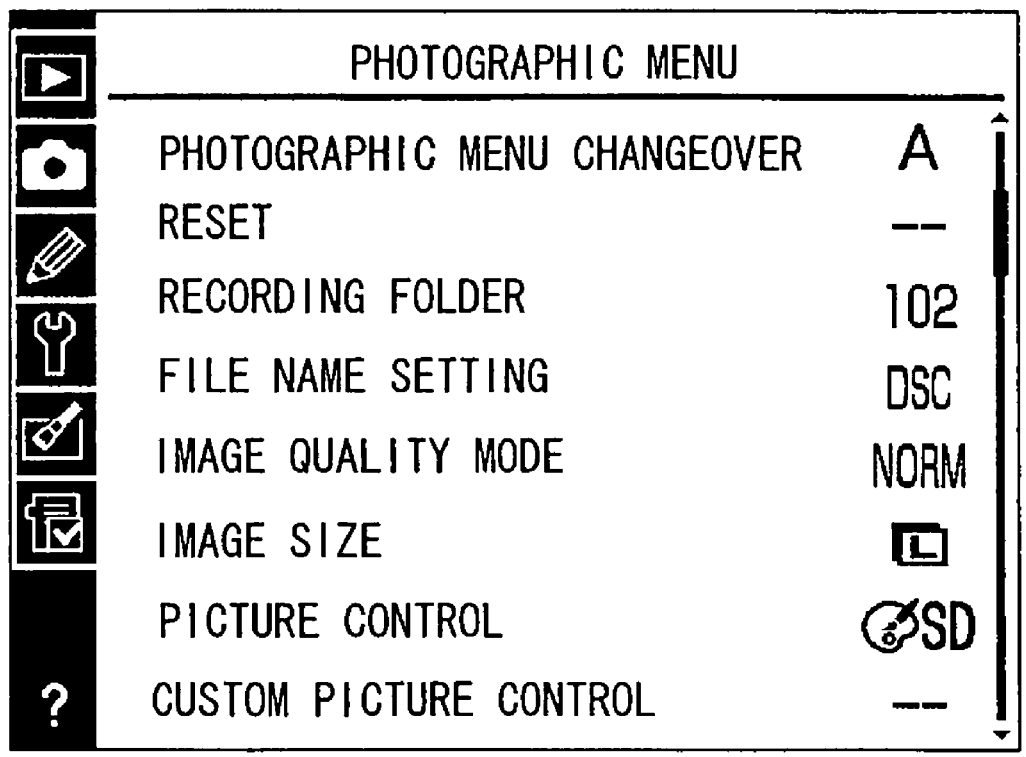
FIG. 5 is a figure showing an example of a menu screen.

The flow of the image quality adjustment setting that has been explained above will now be explained with reference to the menu screens shown by way of example in FIG. 5 and subsequent figures. Upon receipt of a depression actuation signal from the menu button (MENU) 201 (see FIG. 2), the CPU 18 causes the photographic menu screen shown by way of example in FIG. 5 to be displayed upon the liquid crystal monitor 21.

Picture Control

Figure 6:
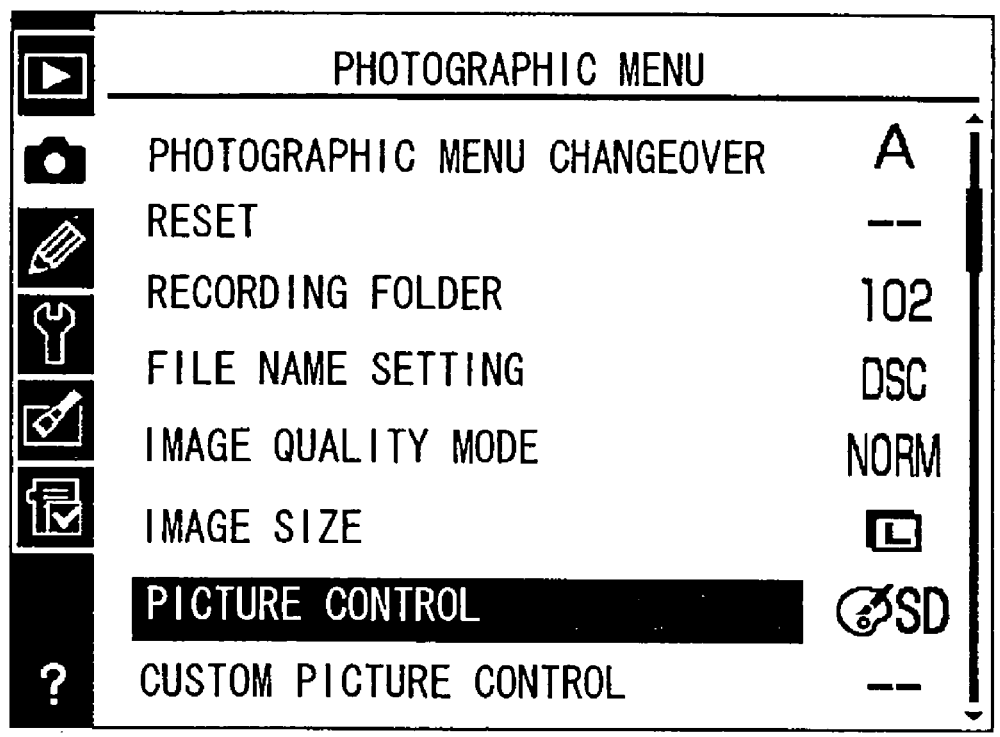
FIG. 6 is a figure showing an example of a menu screen.

Upon receipt of an upwards or downwards actuation signal from the multi selector 205, the CPU 18 causes the cursor to shift upwards or downwards according to that actuation signal. And, upon receipt of a depression actuation signal from the execute button (OK) 204 in the state in which the cursor is positioned over "picture control" (see FIG. 6), the CPU 18 causes the list screen shown by way of example in FIG. 7 to be displayed upon the liquid crystal monitor 21.

Figure 7:
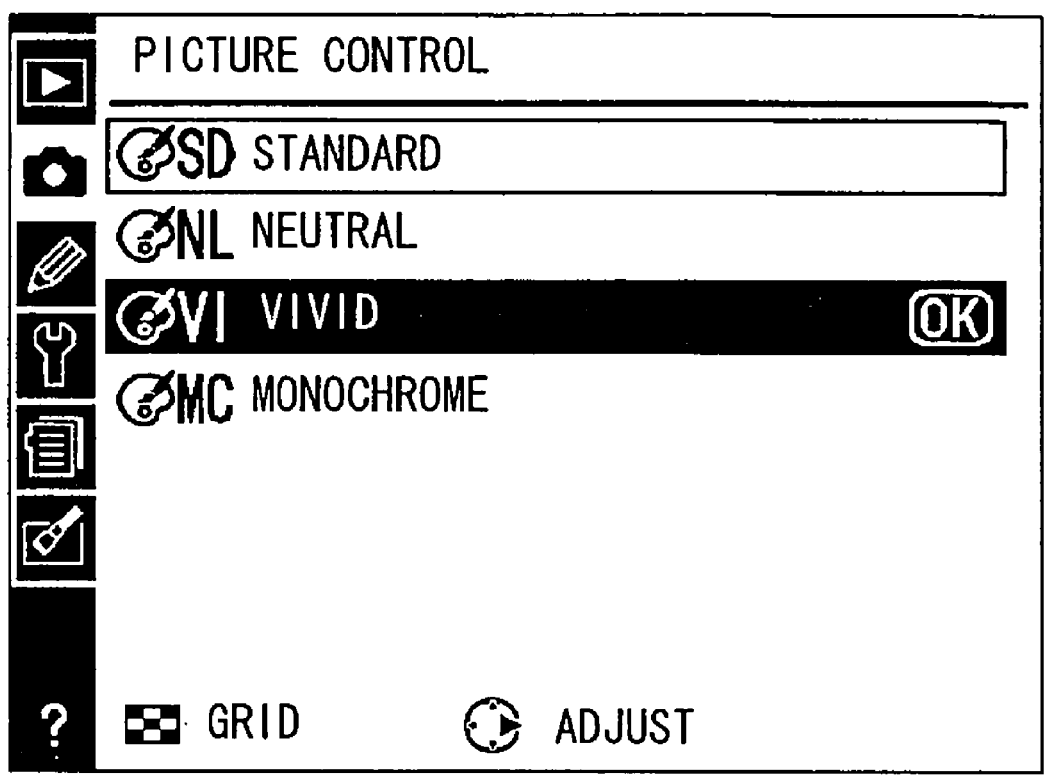
FIG. 7 is a figure showing an example of a menu screen.

The list screen for "picture control" (see FIG. 7) is an actuation screen for using, as appropriate, one or another of the above described four image quality adjustment algorithms for normal image quality adjustment. In FIG. 7, the four image quality adjustment algorithms "SD standard", "NL neutral", "VI vivid", and "MC monochrome" are displayed as a list. It should be understood that, if some other image quality adjustment algorithm is added, the details of this addition are added to the displayed list.

Figure 8:
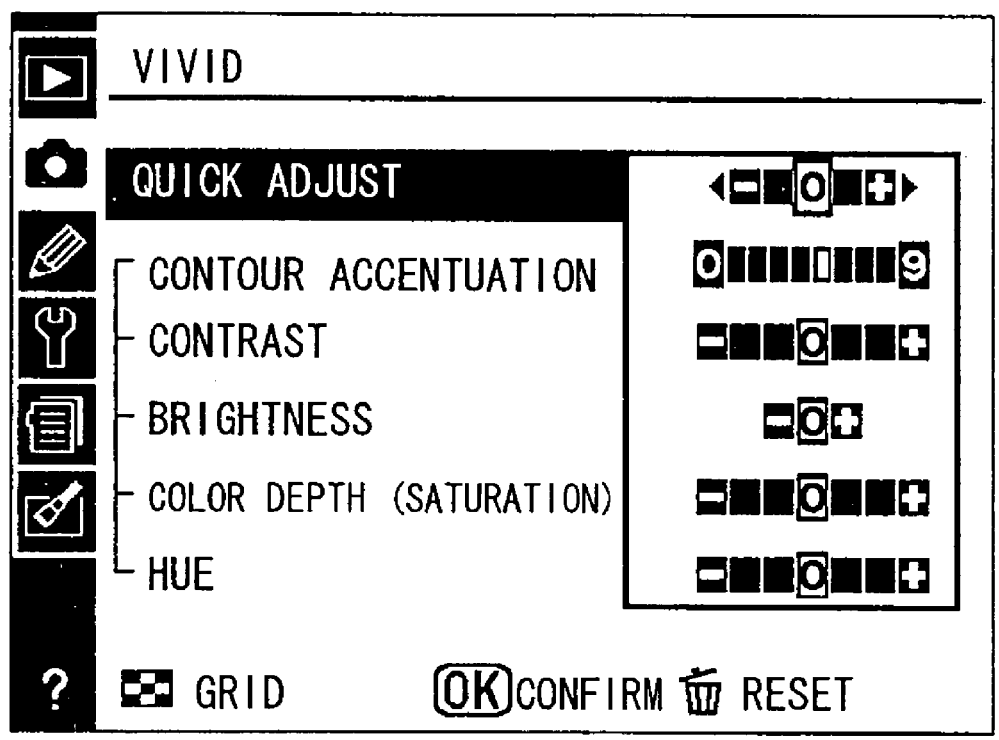
FIG. 8 is a figure showing an example of a menu screen.

Upon receipt of an upwards or downwards actuation signal from the multi selector 205, the CPU 18 shifts the cursor upwards or downwards according to this actuation signal. And, for example, upon receipt of an actuation signal from the multi selector 205 in the rightwards direction in the state (shown in FIG. 7) in which the cursor is positioned above "VI vivid", the CPU 18 displays upon the liquid crystal monitor 21 an adjustment actuation screen such as that shown by way of example in FIG. 8. FIG. 8 is an actuation screen for changing the parameters.

Referring to FIG. 8, upon receipt of an upwards or downwards actuation signal from the multi selector 205, the CPU 18 shifts the cursor upwards or downwards according to this actuation signal. Moreover, upon receipt of a rightwards or leftwards actuation signal from the multi selector 205, the CPU 18 performs changing of the details that are being selected by the cursor, according to this actuation signal. For example, upon receipt of an actuation signal in the rightwards direction in the state (shown in FIG. 8) in which the cursor is positioned above "quick adjust", the CPU 18 shifts the mark above the "quick adjust" bar in the rightwards direction (see FIG. 9). And, upon receipt of a depression actuation signal on the execute button 204 (OK) in this state, the CPU 18 displays a list screen such as the one shown in FIG. 10 upon the liquid crystal monitor 21.

Figure 10:
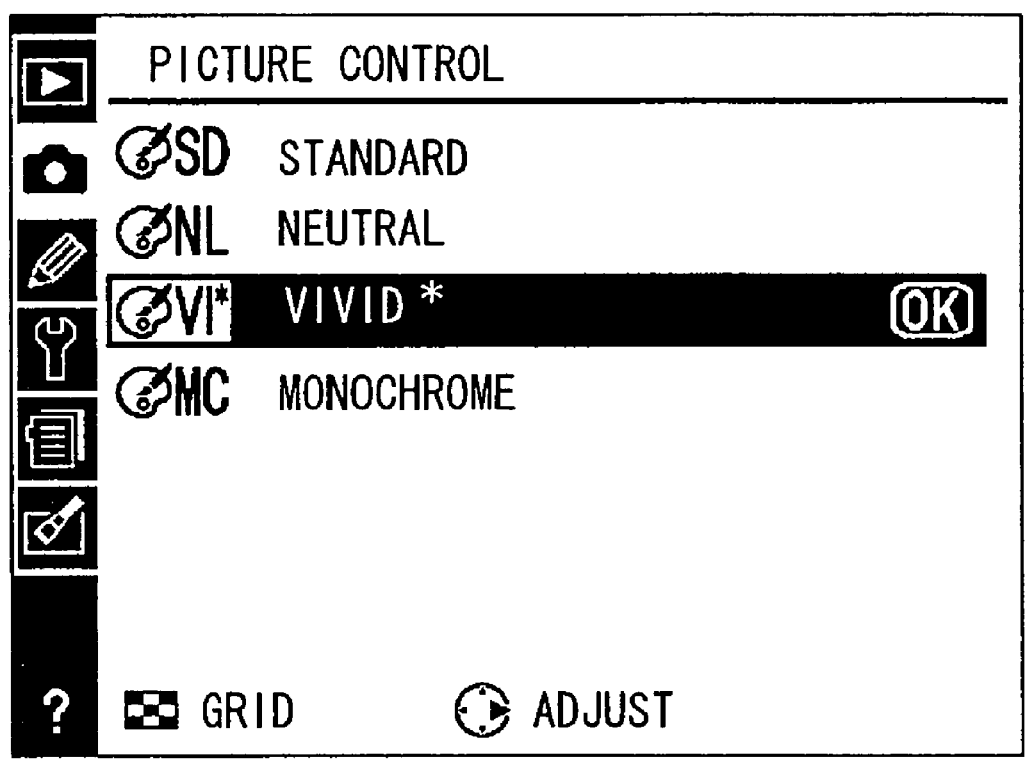
FIG. 10 is a figure showing an example of a menu screen.

According to FIG. 10, an asterisk "*" is added to "VI vivid" so as to show "VI vivid *". This indicates that the standard parameter group (the default values for VI has been changed, and that the parameter group (the changed values) after having been changed has been stored in the area for changed parameters. Here, "quick adjust" means an adjustment in which, by actuating the bar for a single item, a plurality of parameters (for example, contour accentuation, contrast, brightness, saturation, hue and the like) are controlled all together.

Instead of using "quick adjust", it would also be acceptable to change the corresponding parameters one at a time, by shifting the indicating marks on the bars for the various parameters one at a time. For example, upon receipt of an actuation signal in the rightwards direction in the state in which the cursor is positioned over "contour accentuation" (see FIG. 11), the indication on the "contour accentuation" bar is shifted in the rightward direction. And, in this state, upon receipt of a depression actuation signal from the execute button (OK) 204, the CPU 18 also displays upon the display monitor 21 the list screen shown by way of example in FIG. 10. The features that the standard parameter group (the default values for VI) is changed, and that the parameter group after it has been changed (the changed values) is stored in the area for changed parameters, are the same as during the above described "quick adjust".

Upon receipt of a depression actuation signal from the execute button (OK) 204 while the list screen of FIG. 7 or FIG. 10 is being displayed, the CPU 18 sets information about the image quality adjustment algorithm being indicated by the cursor and information about the corresponding parameter group into the image processing circuit 13. Due to this, the details set by "picture control" are reflected in the image quality adjustment processing that the image processing circuit 13 performs.

Figure 9:
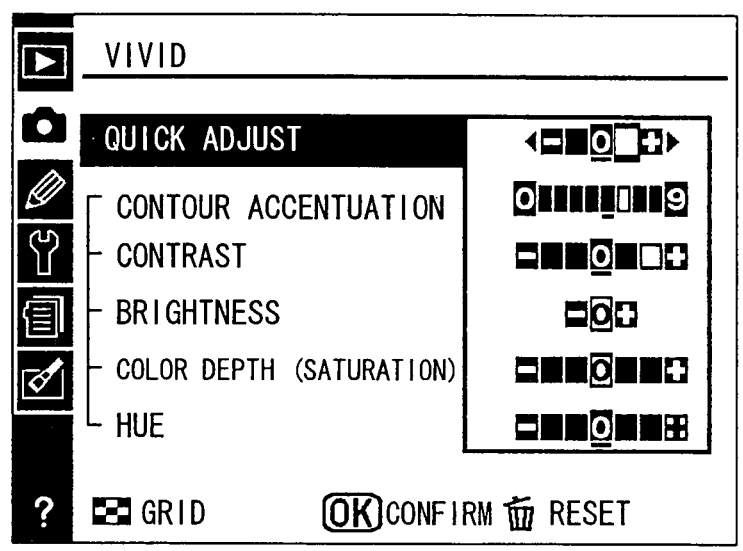
FIG. 9 is a figure showing an example of a menu screen.
Figure 11:
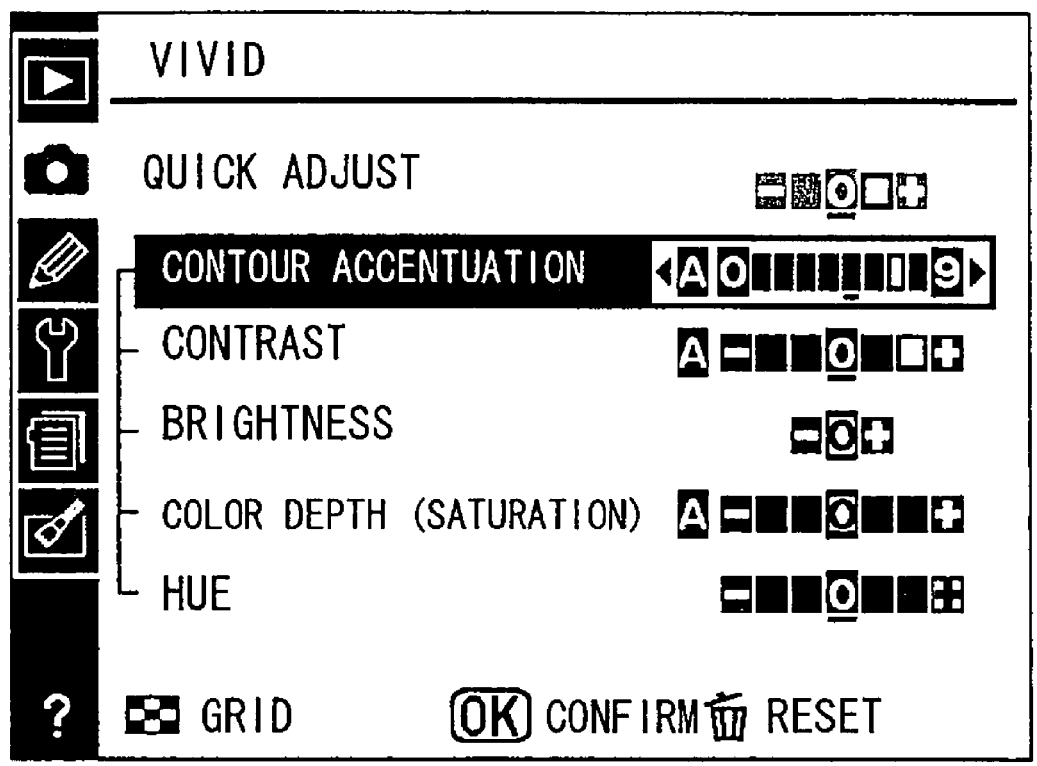
FIG. 11 is a figure showing an example of a menu screen.

When the actuation screen shown by way of example in FIG. 8, FIG. 9, or FIG. 11 is being displayed, upon receipt of a depression actuation signal from the delete button 206, the CPU 18 resets the details that have been changed. In concrete terms, by deleting the parameter group after change (i.e. the changed values) stored in the area for changed parameters, the system returns to the standard parameter group (in the example described above, to the default values for VI). This reset processing is simple, since the standard parameter group is stored in the area for standard parameters.

Custom Picture Control

Figure 12:
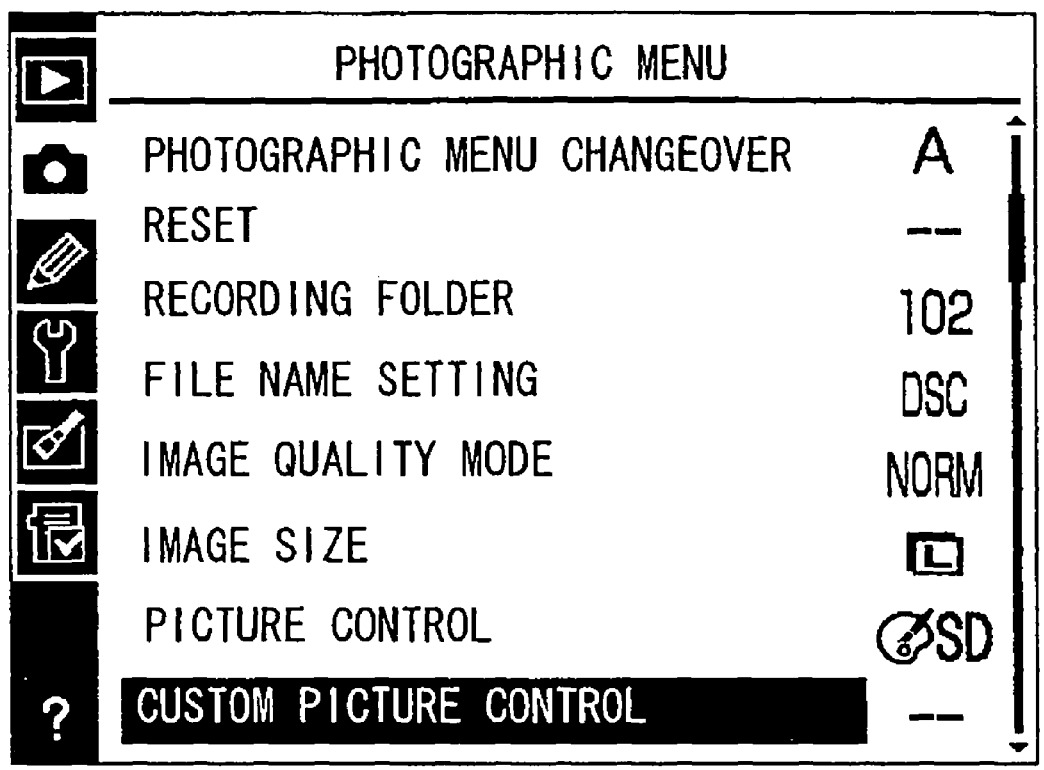
FIG. 12 is a figure showing an example of a menu screen.
Figure 13:
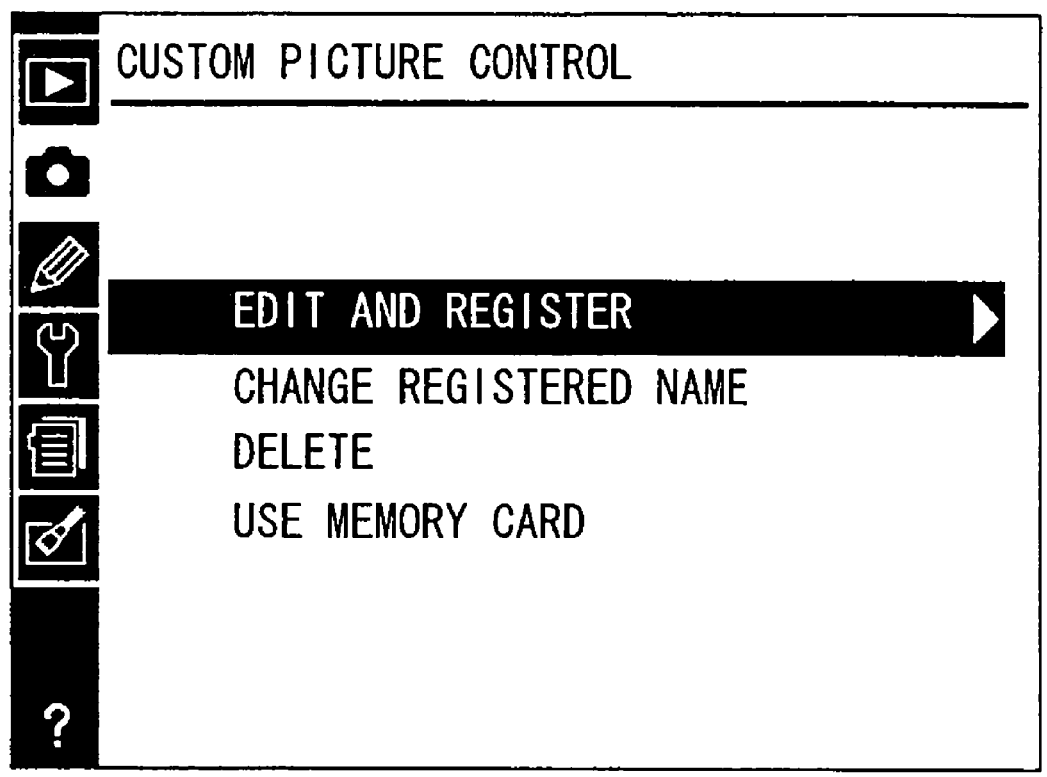
FIG. 13 is a figure showing an example of a menu screen.

Upon receipt of a depression actuation signal from the execute button (OK) 204 in the state in which the cursor is positioned over "custom picture control" (shown in FIG. 12), the CPU 18 displays upon the liquid crystal monitor 21 a menu screen such as that shown by way of example in FIG. 13.

This actuation screen for "custom picture control" (see FIG. 13) is an actuation screen for performing the above described addition of an image quality adjustment algorithm or storage of a parameter group after it has been changed. Upon receipt of an upwards or downwards actuation signal from the multi selector 205, the CPU 18 shifts the cursor upwards or downwards according to this actuation signal.

Choosing a Parameter Group

Figure 14:
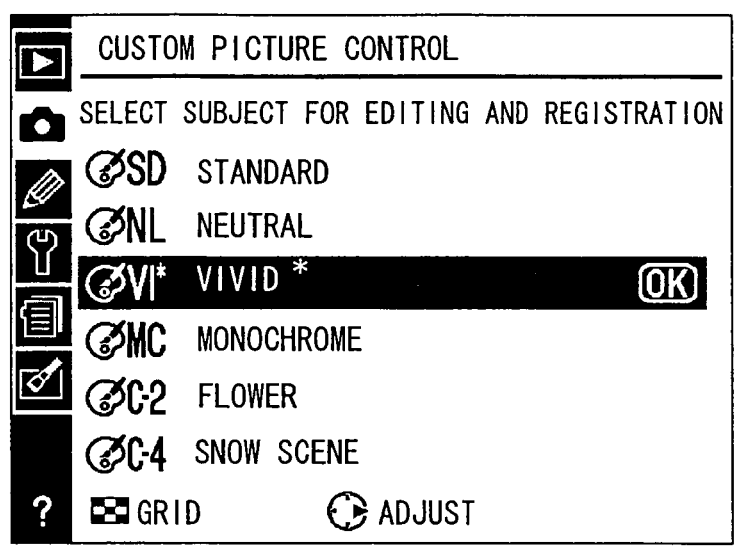
FIG. 14 is a figure showing an example of a menu screen.

Upon receipt of a depression actuation signal from the execute button (OK) 204 in the state in which the cursor is positioned over "edit and register" (shown in FIG. 13), the CPU 18 displays upon the liquid crystal monitor 21 the list screen shown by way of example in FIG. 14.

FIG. 14 is a list screen for selecting the parameter group that is to be the subject of being edited and registered with "custom picture control". In FIG. 14, a list is displayed of the four image quality adjustment algorithms "SD standard", "NL neutral", "VI vivid *", and "MC monochrome", and of the two groups of parameter information "C 2 FLOWER" and "C 4 SNOW SCENE".

Here, each of "SD standard", "NL neutral", and "MC monochrome" denotes a standard parameter group. And "VI vivid *" denotes a parameter group that has been changed by the above described "picture control". Moreover, "C 2 FLOWER" and "C 4 SNOW SCENE" denote parameter groups that have been registered by the steps explained below.

Figure 15:
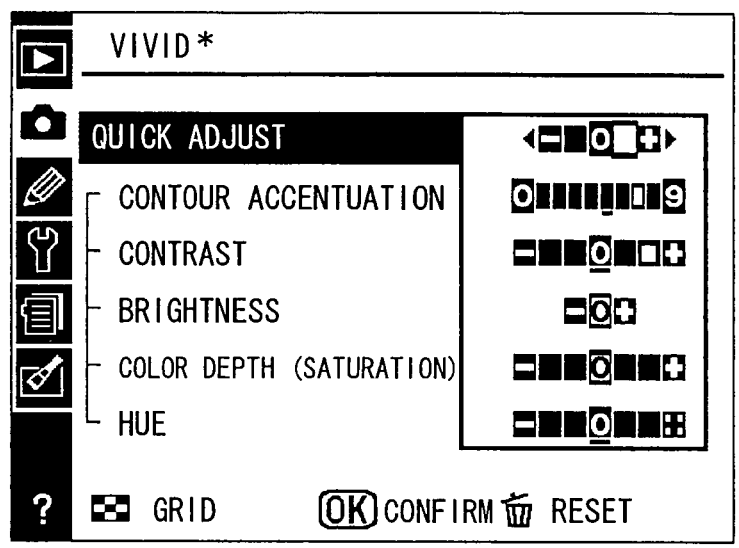
FIG. 15 is a figure showing an example of a menu screen.

Upon receipt of an upwards or downwards actuation signal from the multi selector 205, the CPU 18 shifts the cursor upwards or downwards according to this actuation signal. And, for example, upon receipt of an actuation signal in the rightwards direction from the multi selector 205 in the state in which the cursor is positioned over "VI vivid *" (shown in FIG. 14), the CPU 18 displays upon the liquid crystal monitor 21 the adjustment actuation screen shown by way of example in FIG. 15. FIG. 15 is an actuation screen for changing the parameters, similar to FIG. 8. Upon this actuation screen, it is possible to change the parameters for a second time before registering them.

Figure 16:
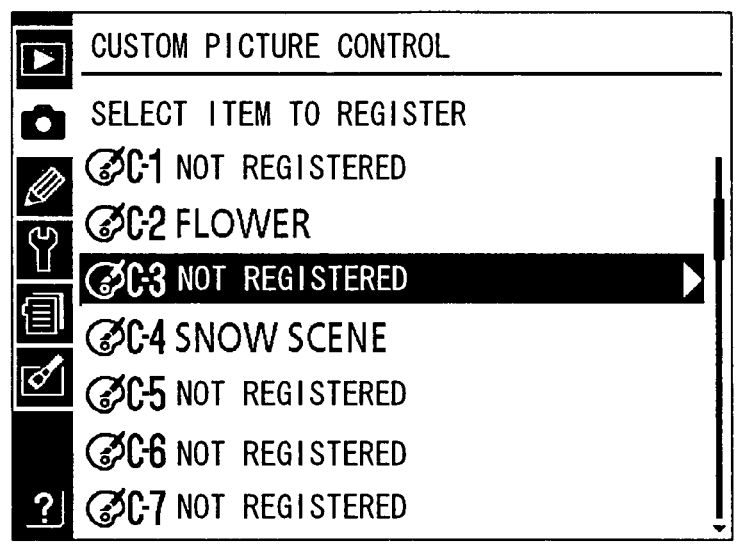
FIG. 16 is a figure showing an example of a menu screen.

Upon receipt of a depression actuation signal from the execute button (OK) 204, the CPU 18 displays upon the liquid crystal monitor 21 the list screen shown by way of example in FIG. 16. In FIG. 16, "C 1" through "C 7" correspond to the above described custom regions (C 1 through C 8 in FIG. 4). Upon receipt of a depression actuation signal from the execute button (OK) 204 in the state (shown in FIG. 16) in which the cursor is positioned over some "not registered" item (for example, "C 3 not registered"), apart from "C 2" and "C 4" that are already registered, the CPU 18 displays upon the liquid crystal monitor 21 the actuation screen shown by way of example in FIG. 17.

Figure 17:
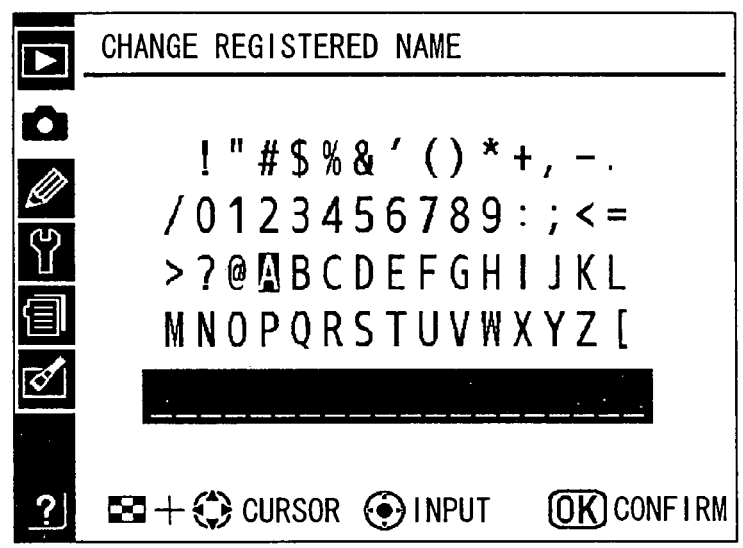
FIG. 17 is a figure showing an example of a menu screen.

While displaying the change registered name screen of FIG. 17, the CPU 18 assigns a registered name according to actuation signals from the multi selector 205 or the like. And, upon receipt of a depression actuation signal from the execute button (OK) 204, the CPU 18 registers the parameter group as, for example, "VIVID 2", and displays upon the liquid crystal monitor 21 the actuation screen shown by way of example in FIG. 12. For example, when registering in the custom region C 3 and displaying a list screen similar to that of FIG. 14, "C 3 VIVID 2" is added to the display list.

Upon receipt of a depression actuation signal from the execute button (OK) 204 while the list screen of FIG. 14 is being displayed, the CPU 18 sets information about the image quality adjustment algorithm being denoted by the cursor and about the corresponding parameter group into the image processing circuit 13. Due to this, the details set by "custom picture control" are reflected in the image quality adjustment processing performed by the image processing circuit 13.

It should be understood that, if this camera does not have an image quality adjustment algorithm to which some parameter group applies, then the CPU 18 eliminates that parameter group from the display list of FIG. 14.

Storing a Parameter Group Upon the Recording Medium

Figure 18:
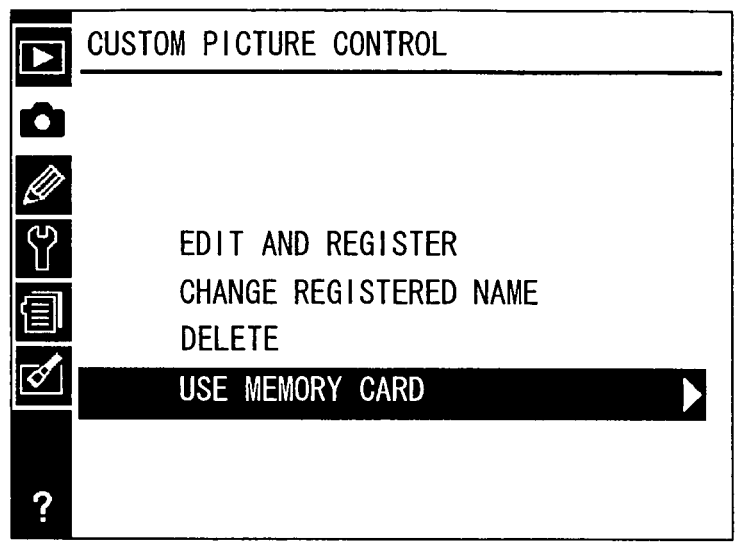
FIG. 18 is a figure showing an example of a menu screen.
Figure 19:
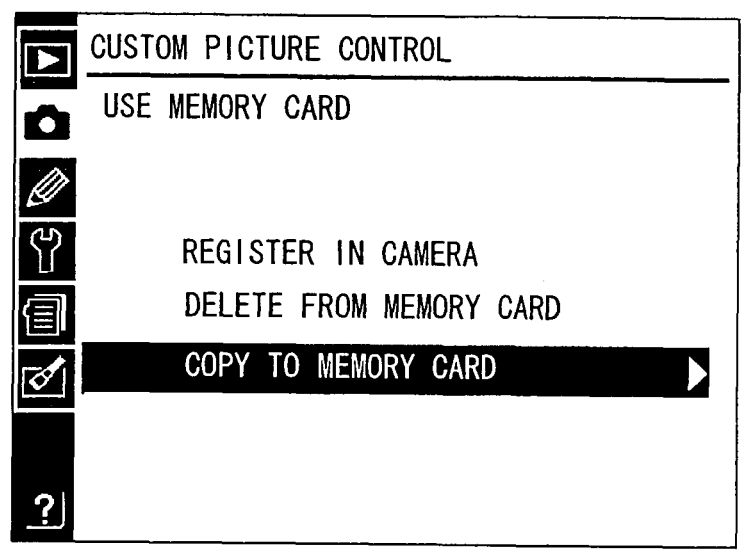
FIG. 19 is a figure showing an example of a menu screen.

Upon receipt of a depression actuation signal from the execute button (OK) 204 in the state in which the cursor is positioned over "use memory card" on the "custom picture control" menu screen (see FIG. 18), the CPU 18 displays upon the liquid crystal monitor 21 the menu screen shown by way of example in FIG. 19.

FIG. 19 is an actuation screen for selecting processing when using "memory card". Upon receipt of a depression actuation signal from the execute button (OK) 204 in the state in which the cursor is positioned over "copy to memory card" on the actuation screen of FIG. 19, the CPU 18 displays upon the liquid crystal monitor 21 the list screen shown by way of example in FIG. 20.

Figure 20:
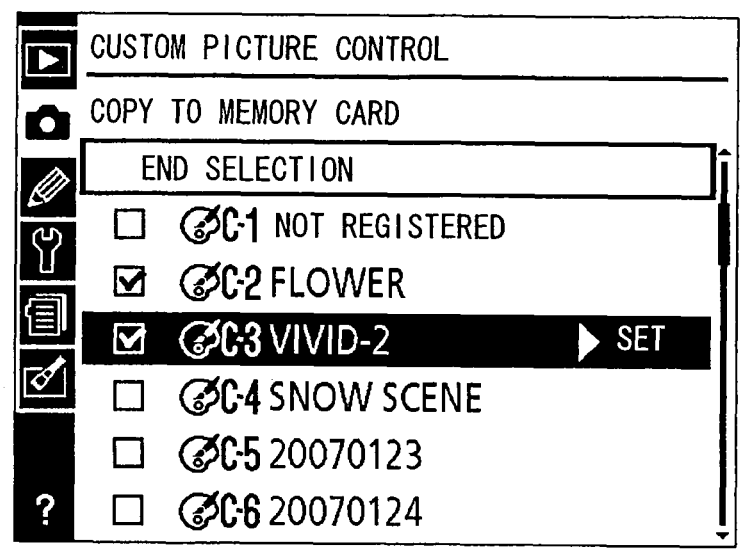
FIG. 20 is a figure showing an example of a menu screen.

In FIG. 20, "C 1" through "C 6" denote parameter groups to which registered names are appended, and that are stored in the custom regions (C 1 through C 8 in FIG. 4) that are provided in the memory 20. Upon receipt of an upwards or downwards actuation signal from the multi selector 205, the CPU 18 shifts the cursor upwards or downwards according to this actuation signal. And, upon receipt of an actuation signal in the rightwards direction from the multi selector 205, the CPU 18 puts a check into the check box for the registered name at which the cursor is positioned. The parameter group with the registered name that is thus checked becomes the subject for being copied from the memory 20 to the recording medium 27.

Figure 21:
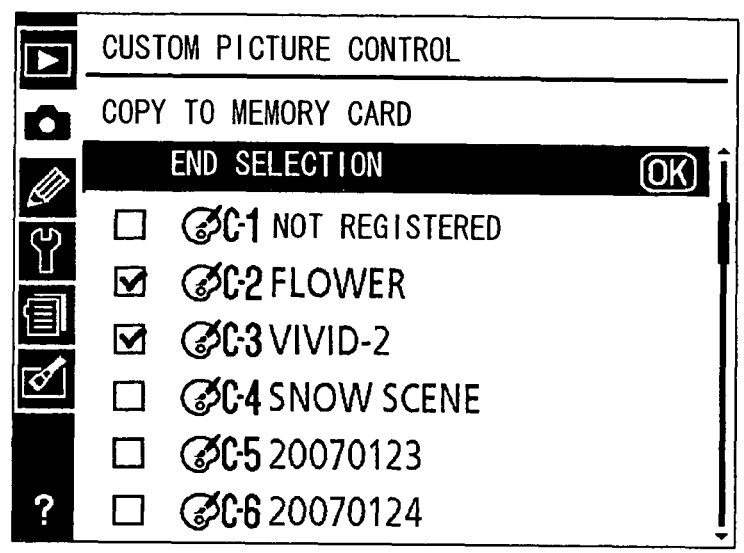
FIG. 21 is a figure showing an example of a menu screen.
Figure 22:
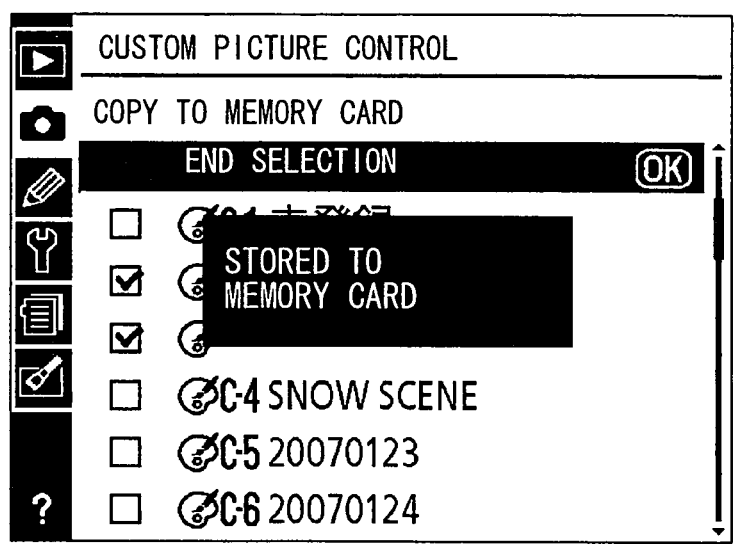
FIG. 22 is a figure showing an example of a menu screen.

Upon receipt of a depression actuation signal from the execute button (OK) 204 in the state in which the cursor is positioned over "end selection" (shown in FIG. 21), the CPU 18 records the parameter group with the registered name that is the subject for copying as a custom picture adjustment file upon the recording medium 27, and displays upon the liquid crystal monitor 21 the message "stored to memory card" (see FIG. 22).

Storing a Parameter Group in the Camera

Figure 23:
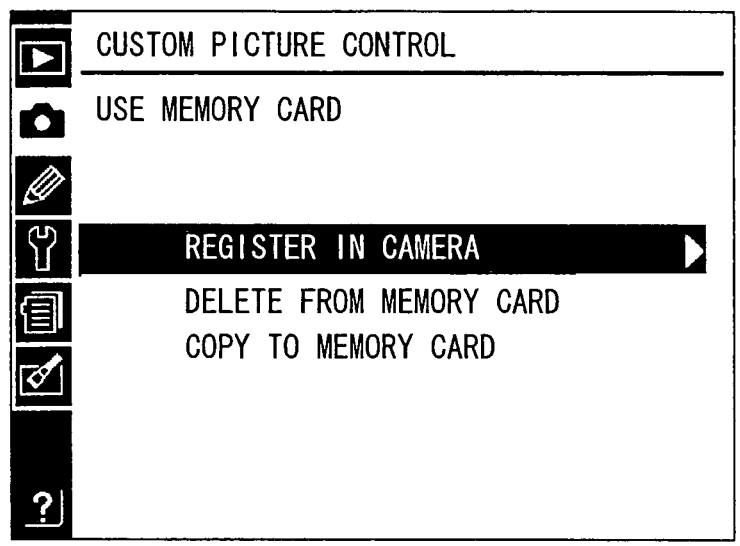
FIG. 23 is a figure showing an example of a menu screen.
Figure 24:
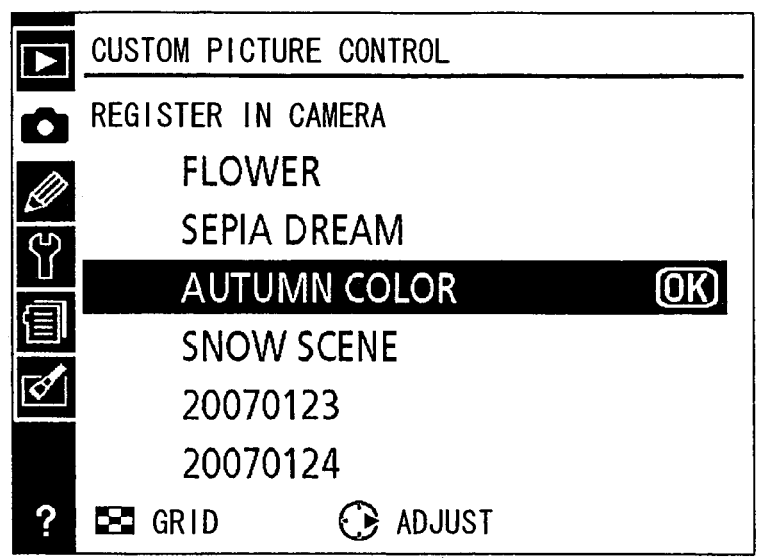
FIG. 24 is a figure showing an example of a menu screen.

Upon receipt of a depression actuation signal from the execute button (OK) 204 in the state in which the cursor is positioned over "register in camera" on a similar actuation screen to FIG. 19 (shown in FIG. 23), the CPU 18 displays upon the liquid crystal monitor 21 the list screen shown by way of example in FIG. 24.

In FIG. 24, "FLOWER", "AUTUMN COLOR", "SNOW SCENE", "20070123" ... denote custom picture adjustment files to which registered names are assigned and that are recorded upon the recording medium 27. These custom picture adjustment files are files in each of which is included a parameter group, ID information that specifies an image quality adjustment algorithm to be applied to that parameter group, and a standard parameter group for that image quality adjustment algorithm to be applied to which parameter group. Upon receipt of an upwards or downwards actuation signal from the multi selector 205, the CPU 18 shifts the cursor upwards or downwards according to this actuation signal.

It should be understood that, if an added base picture adjustment file that includes an added image quality adjustment algorithm is stored on the recording medium 27, then the registered name of this base picture adjustment file is displayed upon the display list of FIG. 24, together with the custom picture adjustment files. In FIG. 24, "SEPIA DREAM" denotes an added base picture adjustment file. It should be understood that it would also be acceptable to provide different display formats for the file name display of a base picture adjustment file and for the file name display of a custom picture adjustment file. For example, a mark (such as "*" or the like) could be added to the file name of a base picture adjustment file, or its color could be changed. A base picture adjustment file is a file that includes a standard parameter group and an image quality adjustment algorithm to be applied to this standard parameter group.

The CPU 18 eliminates from the display list of FIG. 24 any base picture adjustment file that has an image quality adjustment algorithm that has already been added to within the memory 20. Moreover, if no applicable image quality adjustment algorithm is present within the camera, the CPU 18 also eliminates from the display list of FIG. 24 any custom picture adjustment file that includes a parameter group to which that image quality adjustment algorithm is applied.

Figure 25:
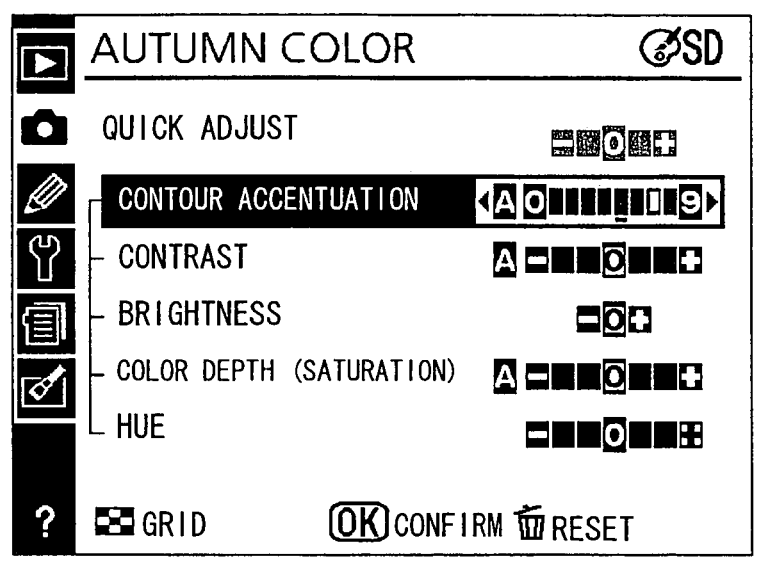
FIG. 25 is a figure showing an example of a menu screen.

Upon receipt of an actuation signal from the multi selector 205 in the rightward direction in the state in which, for example, the cursor is positioned over "AUTUMN COLOR" (shown in FIG. 24), the CPU 18 displays upon the liquid crystal monitor 21 the adjustment actuation screen shown by way of example in FIG. 25. FIG. 25 is an actuation screen for changing the parameters. With this actuation screen, it is possible to change the parameters for a second time before storing them in the camera.

It is arranged for it not to be possible to select the item "quick adjust" on the adjustment actuation screen for the parameter group of a custom picture adjustment file, that is different from the case of making a change actuation for the parameter group of the base picture adjustment file (see FIG. 8 and FIG. 15)

Upon receipt of a depression actuation signal from the execute button (OK) 204 in the state in which the cursor is positioned over, for example, "AUTUMN COLOR" (shown in FIG. 24), the CPU 18 records the contents of the picture adjustment file with the registered name that is to be the subject of storage in the memory 20.

Deleting a Parameter Group from the Recording Medium

Figure 26:
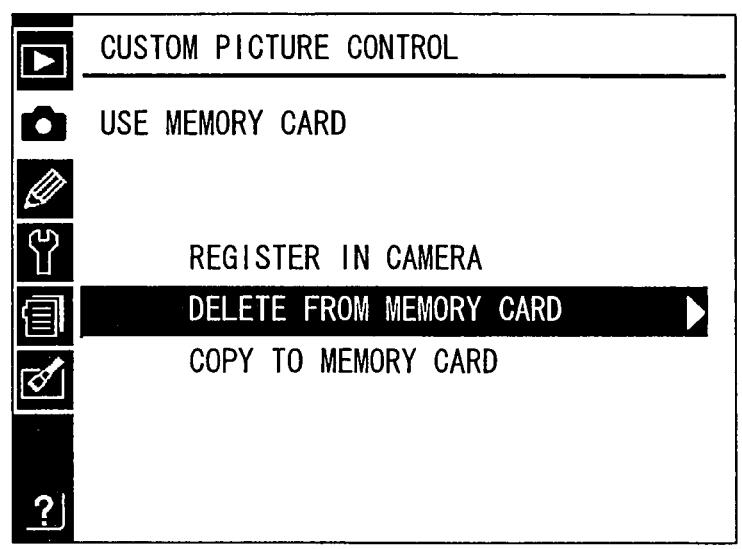
FIG. 26 is a figure showing an example of a menu screen.
Figure 27:
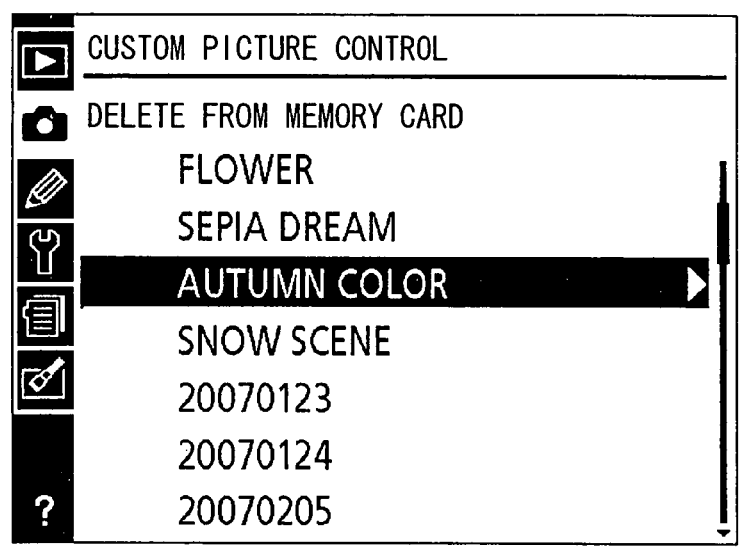
FIG. 27 is a figure showing an example of a menu screen.

Upon receipt of a depression actuation signal from the execute button (OK) 204 in the state (shown in FIG. 26) in which the cursor is positioned over "delete from memory card" on an actuation screen similar to FIG. 19 (FIG. 23), the CPU 18 displays upon the liquid crystal monitor 21 the list screen shown by way of example in FIG. 27.

In FIG. 27, "FLOWER", "SEPIA DREAM", "AUTUMN COLOR" ... denote custom picture adjustment files recorded upon the recording medium 27 to which registered names are assigned. Upon receipt of an upwards or downwards actuation signal from the multi selector 205, the CPU 18 shifts the cursor upwards or downwards according to this actuation signal.

Figure 28:
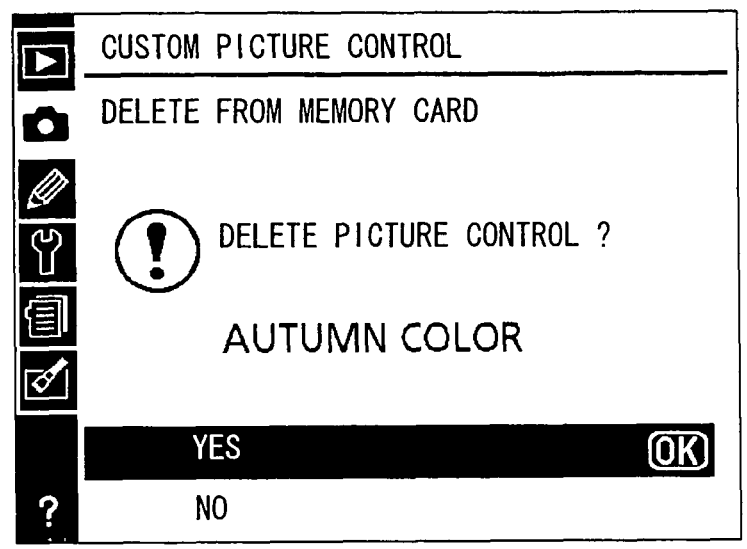
FIG. 28 is a figure showing an example of a menu screen.

And, upon receipt of a depression actuation signal from the execute button (OK) 204 in the state in which the cursor is positioned over, for example, "AUTUMN COLOR" (FIG. 27), the CPU 18 displays upon the liquid crystal monitor 21 the message shown by way of example in FIG. 28. Then, upon receipt of a depression actuation signal from the execute button (OK) 204, the CPU 18 deletes from the recording medium 27 that picture adjustment file whose registered name is the subject for deletion.

Deleting a Parameter Group from the Camera

Figure 29:
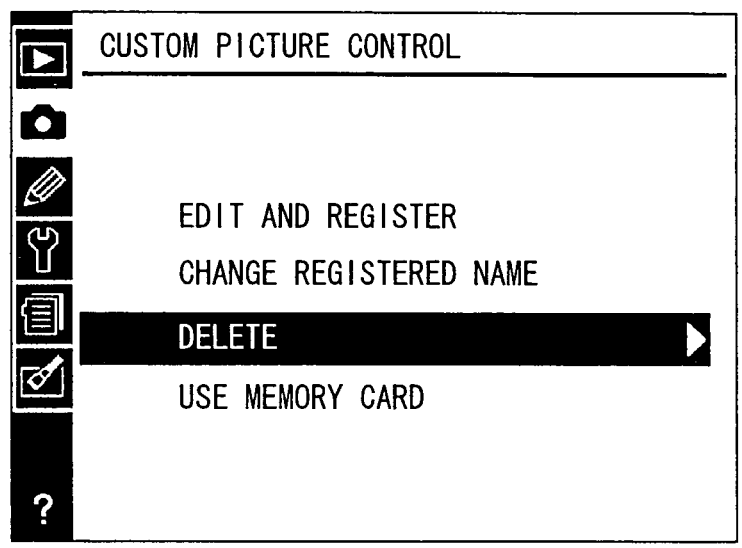
FIG. 29 is a figure showing an example of a menu screen.
Figure 30:
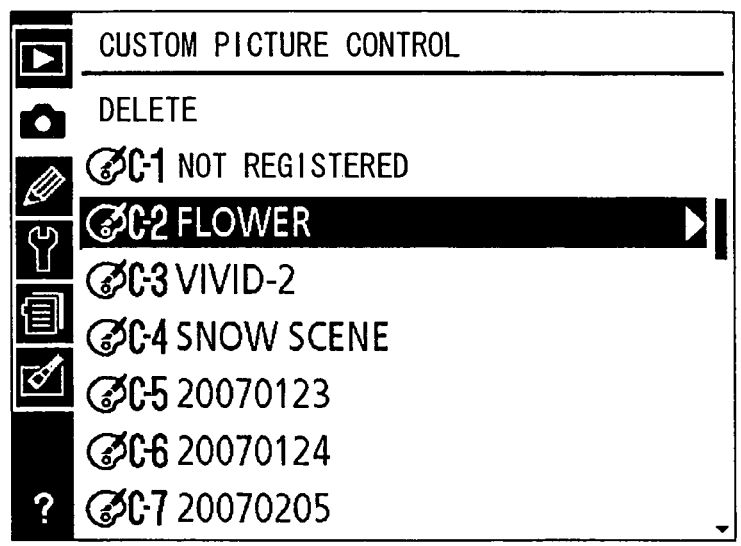
FIG. 30 is a figure showing an example of a menu screen.

Upon receipt of a depression actuation signal from the execute button (OK) 204 in the state in which the cursor is positioned over "delete" on the menu screen for "custom picture control" (FIG. 29), the CPU 18 displays upon the liquid crystal monitor 21 the menu screen shown by way of example in FIG. 30. And, if an added base picture adjustment file is stored in the memory 20, the CPU 18 also displays this added base picture adjustment file upon the liquid crystal monitor 21, together with the custom picture adjustment file. However, if a custom picture adjustment file based upon that base picture adjustment file is present within the memory 20, then the CPU 18 eliminates that base picture adjustment file from the display list of FIG. 30. This is in order to prevent the base picture adjustment file being deleted, which would result in a custom picture adjustment file that could not be used remaining within the camera. It should be understood that it would also be acceptable to arrange for the base picture adjustment files for "standard", "neutral", "vivid", and "monochrome" to be taken as being the subject for deletion, as well as the added base picture adjustment files that are stored in the memory 20. However, in this case, since image processing within the camera main body 200 becomes impossible if all of the base picture adjustment files are deleted, accordingly, if only one base picture adjustment file is present within the memory 20, the deletion of that base picture adjustment file is prohibited.

In FIG. 30, "C 1" through "C 7" denote parameter groups stored in the custom regions (C 1 through C 8 in FIG. 4) that are provided in the memory 20 with registered names assigned to them. Upon receipt of an upwards or downwards actuation signal from the multi selector 205, the CPU 18 shifts the cursor upwards or downwards according to this actuation signal.

Figure 31:
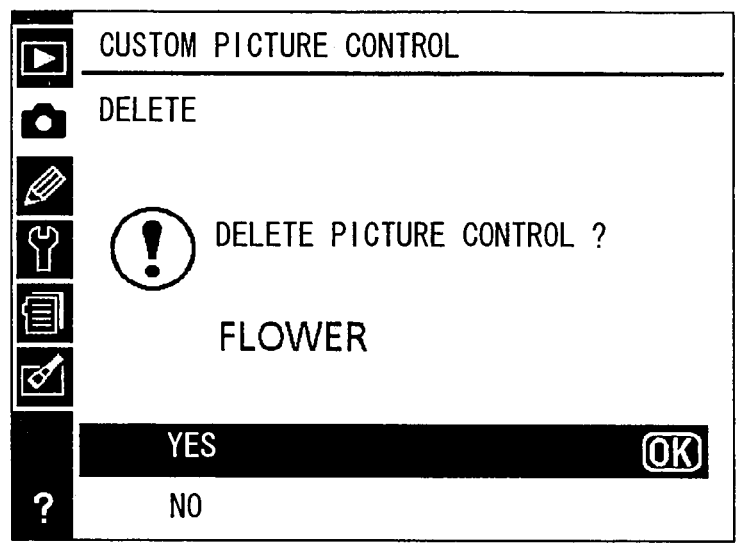
FIG. 31 is a figure showing an example of a menu screen.

And, upon receipt of a depression actuation signal from the execute button (OK) 204 in the state in which the cursor is positioned over, for example, "C 2 FLOWER" (FIG. 30), the CPU 18 displays upon the liquid crystal monitor 21 the message shown by way of example in FIG. 31. And, upon receipt of a depression actuation signal from the execute button (OK) 204, the CPU 18 deletes from the memory 20 the parameter group whose registered name is the subject for deletion.

Changing the Registered Name of a Parameter Group

Figure 32:
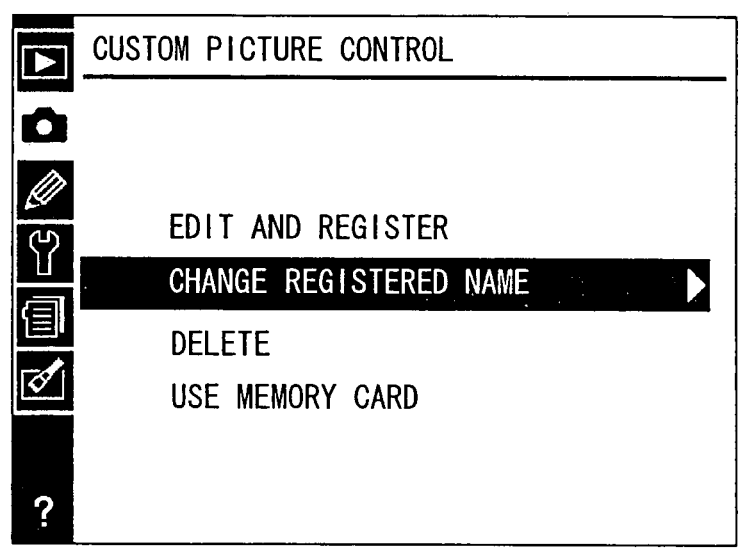
FIG. 32 is a figure showing an example of a menu screen.
Figure 33:
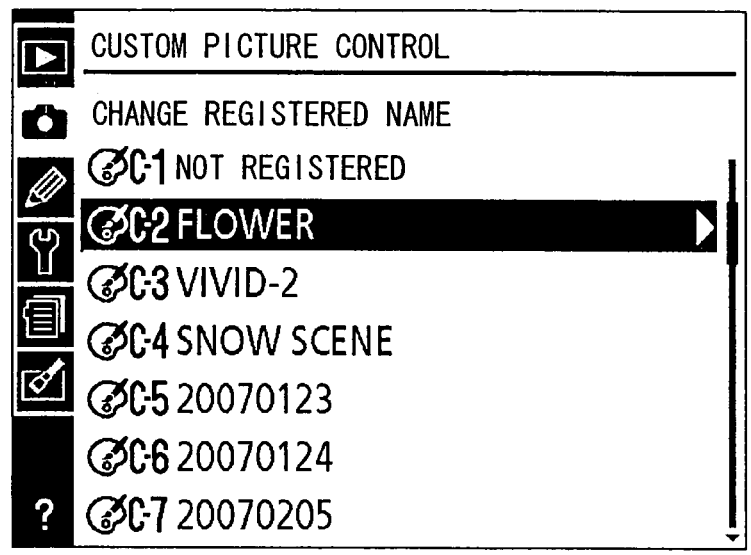
FIG. 33 is a figure showing an example of a menu screen.

Upon receipt of a depression actuation signal from the execute button (OK) 204 in the state in which the cursor is positioned over "change registered name" on the "custom picture control" menu screen (FIG. 32), the CPU 18 displays upon the liquid crystal monitor 21 the menu screen shown by way of example in FIG. 33.

In FIG. 33, "C 1" through "C 7" denote parameter groups stored in the custom regions (C 1 through C 8 in FIG. 4) that are provided in the memory 20 with registered names assigned to them. Upon receipt of an upwards or downwards actuation signal from the multi selector 205, the CPU 18 shifts the cursor upwards or downwards according to this actuation signal.

Upon receipt of a depression actuation signal from the execute button (OK) 204 in the state in which the cursor is positioned over, for example, "C 2 FLOWER" (FIG. 33), the CPU 18 displays a similar actuation screen to FIG. 17 upon the liquid crystal monitor 21.

And the CPU 18 assigns a registered name according to actuation signals from the multi selector 205 or the like while the change registered name screen of FIG. 17 is being displayed. Then, upon receipt of a depression actuation signal from the execute button (OK) 204, the CPU 18 displays upon the liquid crystal monitor 21 the actuation screen of FIG. 12, with the name changed to the newly registered name.

Base Picture Adjustment Files

The contents included in a base picture adjustment file will now be explained. A base picture adjustment file includes:
 [a1] type of device ID
 [a2] the image quality adjustment ID
 [a3] title of the image quality adjustment (ASCII)
 [a4] abbreviation for the image quality adjustment (ASCII)
 [a5] icon data denoting the image quality adjustment
 [a6] title of the image quality adjustment (various languages)
 [a7] help display (various languages)
 [a8] font data for various languages
 [a9] file record information
 [a10] map information specifying the image quality adjustment
 [a11] standard parameter group
 [a12] the image quality adjustment algorithm The type of device ID information is information that specifies what type of device the electronic camera is. The image quality adjustment ID information is information that specifies the image quality adjustment algorithm. The title of image quality adjustment is, for example, "Vivid", while the abbreviation for image quality adjustment is, for example, "VI". The icon data denoting image quality adjustment is display data when an icon is to be displayed. The title of image quality adjustment is display information for various languages. The help display information is display information for various languages. The font data for various languages is information about the fonts for various languages. The file record information is information related to that file. The map information specifying image quality adjustment is information for displaying a map, as will be described hereinafter. And the standard parameter group and the image quality adjustment algorithm are as described above.

Custom Picture Adjustment Files

The contents included in a custom picture adjustment file will now be explained. A custom picture adjustment file includes:
 [b1] type of device ID
 [b2] the image quality adjustment ID
 [b3] title of the image quality adjustment (ASCII)
 [b4] file record information
 [b5] parameter group
 [b6] standard parameter group The type of device ID information is information that specifies what type of device the electronic camera is. The image quality adjustment ID information is information that specifies the image quality adjustment algorithm. The title of image quality adjustment is, for example, "Vivid". The file record information is information related to that file. And the standard parameter group and the image quality adjustment algorithm are as described above.

Quick Adjustment

Now "quick adjust" upon the actuation screens for changing parameters shown by way of example in FIGS. 8, 9, and 15 will be explained in detail. In FIGS. 8, 9, and 15, it is arranged for a mark upon a quick adjust bar to be shiftable in five steps: the center (0), two steps to the left, and two steps to the right. In this embodiment, combinations of settings for contour accentuation, contrast, brightness, saturation, and hue are determined in advance for each of the five steps of quick adjustment, as shown in the examples in FIGS. 34 and 35, and are stored in the memory 20.

The CPU 18 reads out the data in the table of FIG. 34 or FIG. 35 according to the position of the mark upon the quick adjust bar, and changes the adjusted value for each of the parameters contour accentuation, contrast, brightness, saturation, and hue according to the data that has been read out.

For example, when performing quick adjustment upon the standard parameter group of the image quality adjustment algorithm "Vivid", then, if the mark upon the quick adjust bar is shifted one step to the right from the center (0) position, then the CPU 18 reads out the data "5, +1, 0, +1, 0" that corresponds to the quick adjust level "+1" in FIG. 35. And the CPU 18 changes the parameter group by shifting the mark upon the "contour accentuation" bar to "5", the mark upon the "contrast" bar to "+1", the mark upon the "brightness" bar to "0", the mark upon the "saturation" bar to "+1", and the mark upon the "hue" bar to "0". The table data in FIGS. 34 and 35 are determined so as to correspond to the positions of the marks upon the bars, if each of the parameters is changed individually.

Figure 36:
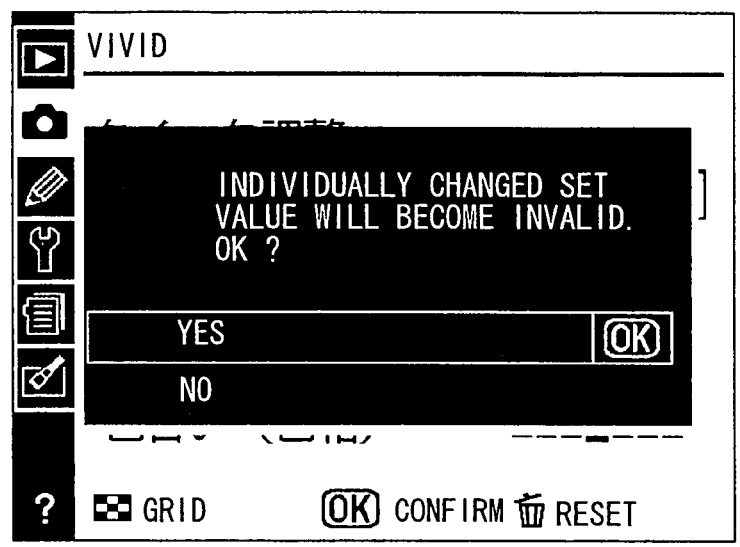
FIG. 36 is a figure showing an example of a menu screen.

When performing "quick adjust" after having performed actuation to change one or more parameters individually by using an actuation screen such as the one shown by way of example in FIG. 11, it sometimes happens that there is an incompatibility with the values of parameters that have been changed individually. In this case, the CPU 18 displays a message such as the one shown by way of example in FIG. 36 upon the liquid crystal monitor 21, and then, upon receipt of a depression actuation signal from the execute button (OK) 204, makes the value of the individually changed parameter ineffective, and stores the parameter set value according to "quick adjust".

Map Display

Figure 37:
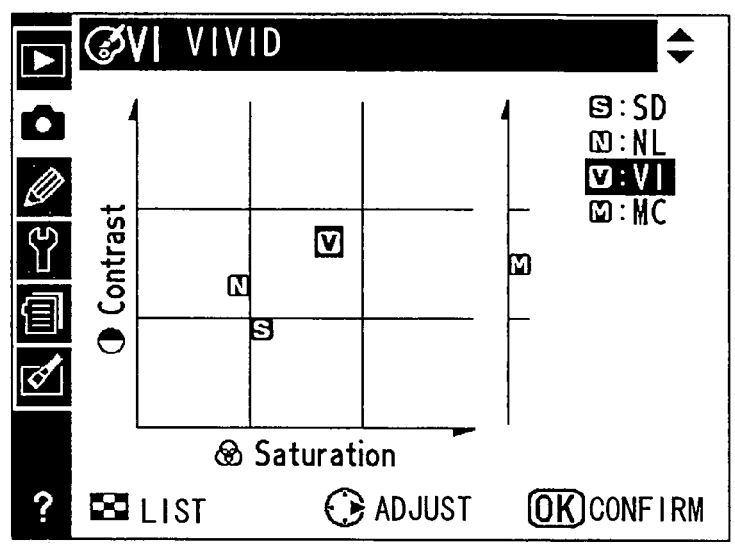
FIG. 37 is a figure showing an example of a map display screen.

If a depression actuation signal from the function button (F) 202 has been received during display of the "picture control" list screen (FIG. 7 or FIG. 10), then the CPU 18 displays a map display showing the image quality adjustment upon the liquid crystal monitor 21. FIG. 37 is a figure showing an example of a map display screen that corresponds to the list screen of FIG. 7. This map display is one that shows the characteristics of image quality adjustment upon a two dimensional surface, with the saturation in a parameter group being shown along the horizontal axis and the contrast being shown along the vertical axis. This type of two dimensional plane display is also termed a "grid display".

In FIG. 37, "V", "N", and "S" are displayed upon the two dimensional plane surface. "V" specifies the contrast and the saturation of the standard parameters that correspond to the basic picture adjustment file "Vivid". In a similar manner, "S" specifies the contrast and the saturation of the standard parameters that correspond to the basic picture adjustment file "Standard", and "N" specifies the contrast and the saturation of the standard parameters that correspond to the basic picture adjustment file "Neutral". And "M" corresponds to the basic picture adjustment file "Monochrome". Since in the case of "Monochrome" no saturation information is included in the standard parameters, accordingly only contrast information is specified in the right end portion of the two dimensional plane surface.

The image quality adjustment algorithms "SD" (standard), "NL" (neutral), "VI" (vivid), and "MC" (monochrome) are displayed as a list at the upper right portion of the map display screen. Upon receipt of an upwards or downwards actuation signal from the multi selector 205, the CPU 18 shifts the cursor upwards or downwards over the list display according to this actuation signal. In the state in which the cursor is positioned, for example, over "VI" (vivid), the "V" in the map display is displayed as accentuated (for example by a black character display upon a white ground), i.e. in a different manner as compared with the other "S", "N", and "M".

Upon receipt of an actuation signal from the multi selector 205 in the rightwards direction while the map display screen is being displayed, the CPU 18 displays the adjustment actuation screen shown by way of example in FIG. 8 upon the liquid crystal monitor 21. Moreover, upon receipt of a depression actuation signal from the function button (F) 202 while the map display screen is being displayed, the CPU 18 displays the list screen shown in FIG. 7 upon the liquid crystal monitor 21.

Figure 38:
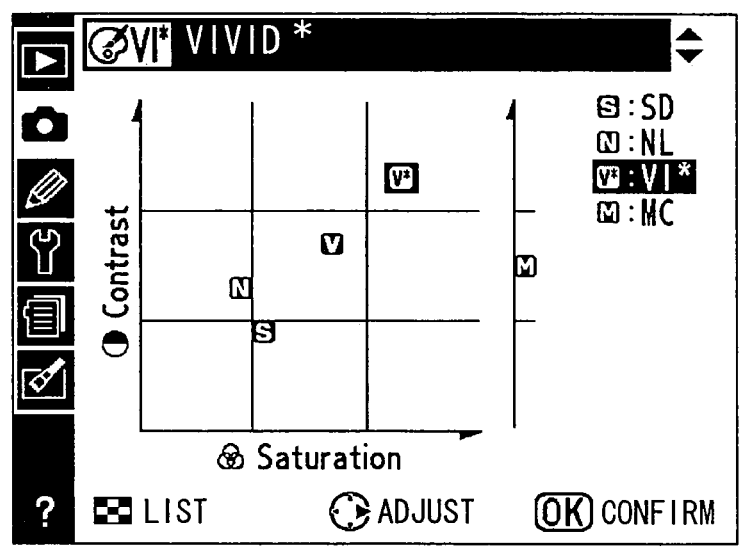
FIG. 38 is a figure showing an example of a map display screen.

FIG. 38 is a figure showing an example of a map display screen that corresponds to the list screen of FIG. 10. As compared with FIG. 37, the distinction between the displayed marks "VI" (Vivid) and "VI*" (Vivid*) will be understood. This means that it is arranged to be able to compare, upon the two dimensional plane, the image quality adjustment according to the standard parameter group (the default values for "Vivid"), and the image quality adjustment according to the parameter group that has been changed (i.e. according to the changed values).

Figure 39:
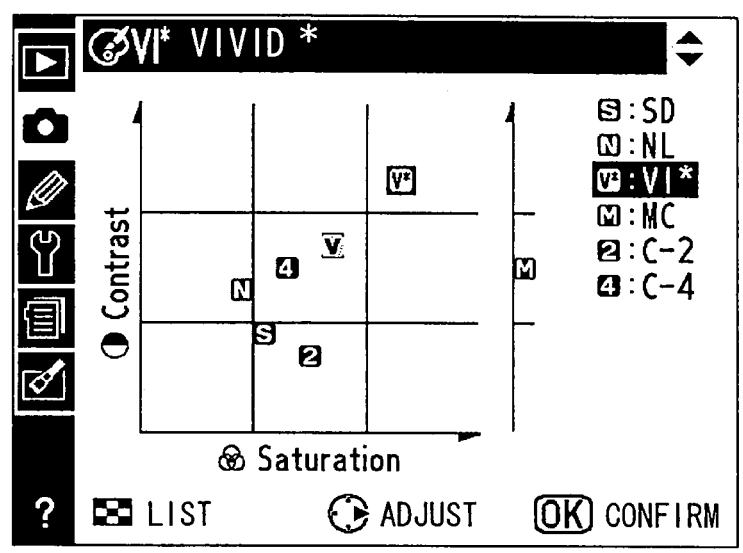
FIG. 39 is a figure showing an example of a map display screen.

Upon receipt of a depression actuation signal from the function button (F) 202 while the list screen for "custom picture control" is being displayed (FIG. 14) as well, the CPU 18 displays a map display (i.e. a grid display) showing the image quality adjustment upon the liquid crystal monitor 21. FIG. 39 is a figure showing an example of a map display screen that corresponds to the list screen of FIG. 14. As compared with FIG. 38, the feature of difference is that two marks "2" (C 2) and "4" (C 4) are added for parameter information corresponding to custom picture adjustment files.

Upon receipt of an actuation signal from the multi selector 205 in the rightwards direction while the map display screen is being displayed, the CPU 18 displays the adjustment actuation screen shown by way of example in FIG. 15 upon the liquid crystal monitor 21. And, upon receipt of a depression actuation signal from the function button (F) 202 while the map display screen is being displayed, the CPU 18 displays the list screen shown in FIG. 14 upon the liquid crystal monitor 21.

Overlapping Processing

Figure 40:
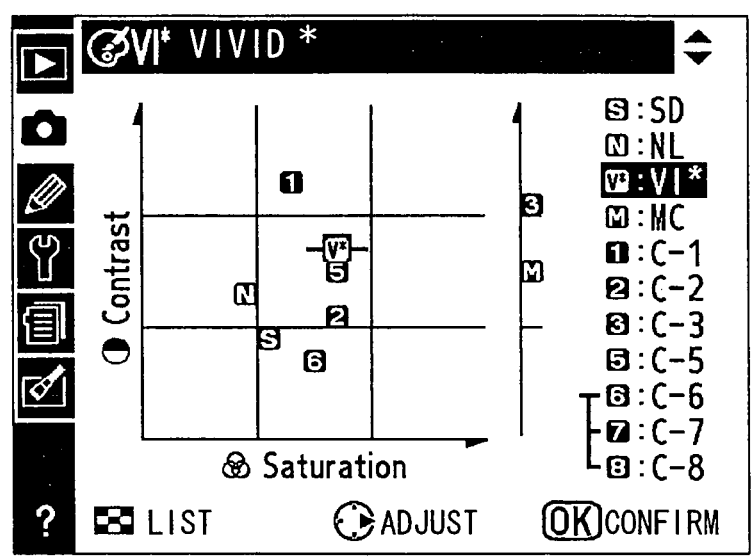
FIG. 40 is a figure showing an example of a map display screen.

In the case of "custom picture control", in addition to the standard parameter information for a basic picture adjustment file, the parameter information for custom picture adjustment files is displayed upon the map. Due to this, if a large number of custom picture adjustment files are registered, the contents of the display become crowded. FIG. 40 is a figure showing an example of a map display screen upon which a large number of custom picture adjustment files are registered.

In FIG. 40, there is shown an example of a case in which the three sets of parameter information "6" (C 6), "7" (C 7), and "8" (C 8) are shown together upon the map. In this case, as a representative, the CPU 18 displays only the parameter information "6" (C 6) upon the map, and omits the display upon the map of the parameter information "7" (C 7) and the parameter information "8" (C 8). Moreover, the CPU 18 shows that these are common upon the map by connecting the "6" (C 6), the "7" (C 7), and the "8" (C 8) in the list display at the right portion of the screen together with a line. When displaying such common parameter information in a representative manner like this, the set that is shown in an upper position in the list display is displayed as a priority upon the map.

Priority Display

Figure 41:
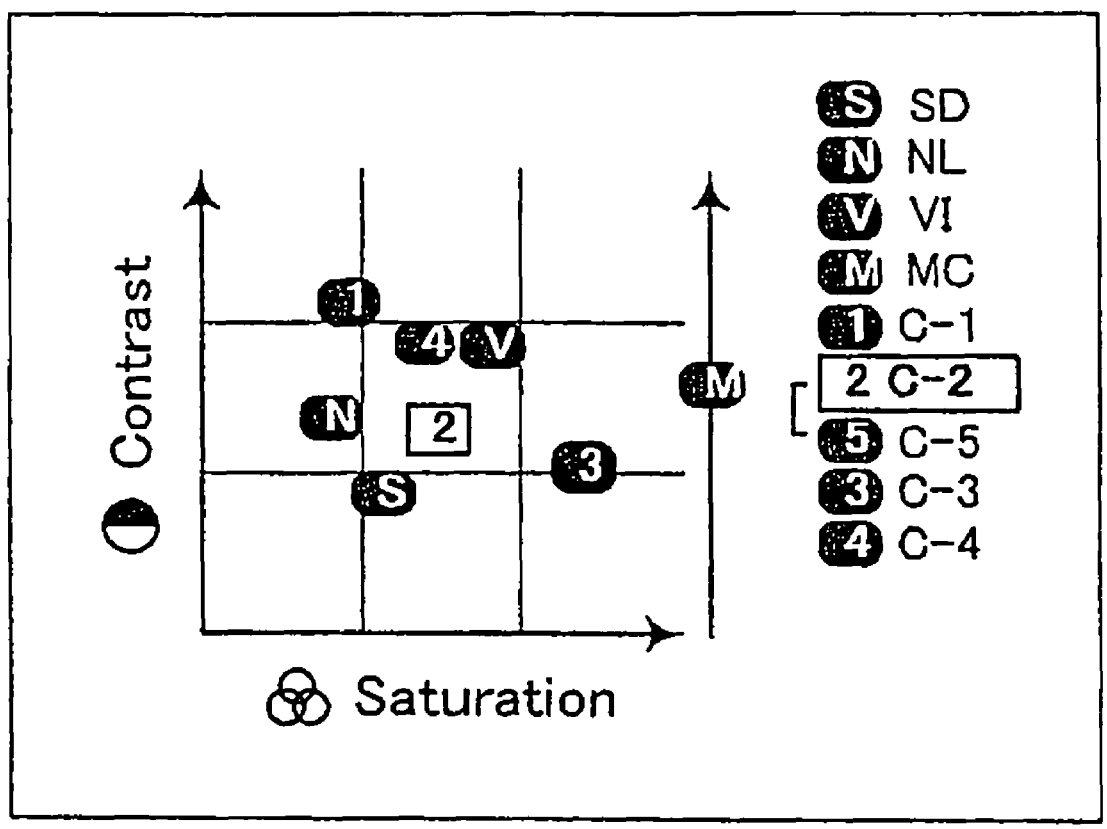
FIG. 41 is a figure showing an example of a map display screen.

FIG. 41 is a figure in which the map display portion has been extracted, in order to explain the overlapping processing. In the case of FIG. 41, two sets of parameter information "2" (C 2) and "5" (C 5) that correspond to custom picture adjustment files are shown together upon the map. The CPU 18 joins the "2" (C 2) and the "5" (C 5) in the list display at the right portion of the screen together with a line. At this time, by inserting the "5" (C 5) before the "3" (C 3) and the "4" (C 4) in the list order, the "2" (C 2) and the "5" (C 5) that are shown together upon the map are displayed so as directly to follow one another. Since, in FIG. 41, the cursor is positioned over "2" (C 2), accordingly "2" is displayed as priority in the map display.

Figure 42:
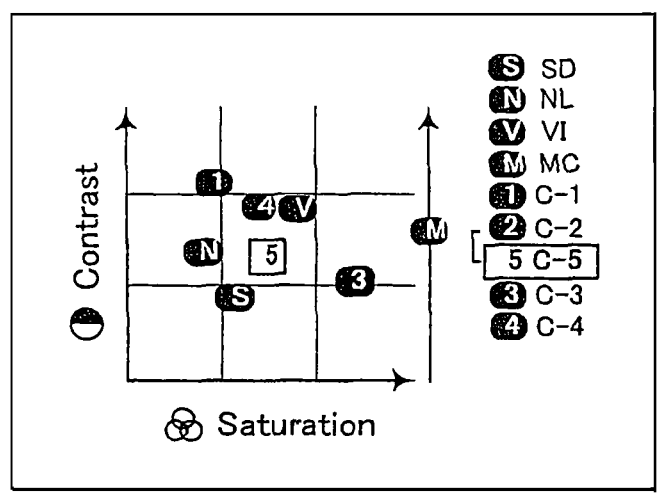
FIG. 42 is a figure showing an example of a map display screen.

FIG. 42 is a figure showing the example of the map display screen when the cursor has been shifted over "5" (C 5). In this case, instead of displaying the uppermost one in the list display as a priority, "5" in the map display that corresponds to the cursor position is displayed as a priority.

Display Showing Automatic Settings

It is arranged for the electronic camera to be possible to perform automatic settings for "contrast" and "saturation" by shifting the mark upon the bar for each parameter, as shown by way of example in FIG. 11 that is an actuation screen used for changing the parameters. The CPU 18 automatically sets each of these parameters when the mark upon its bar is shifted to a position "A" at its left end. When the automatic setting related to "contrast" has been made, the CPU 18 sets a parameter that determines the strength of "contrast" automatically from the image that is to be the subject of the image quality adjustment processing. Furthermore, when the automatic setting related to "saturation" has been made, the CPU 18 sets a parameter that determines the "saturation" automatically from the image that is to be the subject of the image quality adjustment processing.

Figure 43:
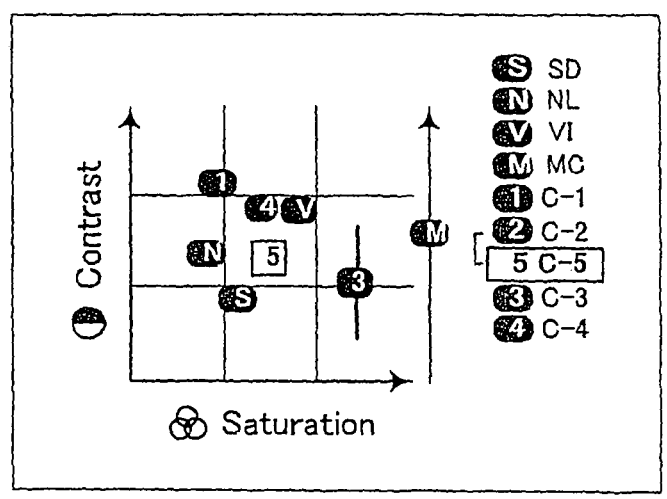
FIG. 43 is a figure showing an example of a map display screen.

When showing the automatic settings described above upon the map display, the CPU 18 shows these automatic settings by drawing a line upon the map. FIG. 43 is a figure showing an example of a map display screen when the parameter "contrast" for the custom picture adjustment file "3" (C 3) is set automatically. A line that extends vertically is displayed through the "3" in the map display.

Figure 44:
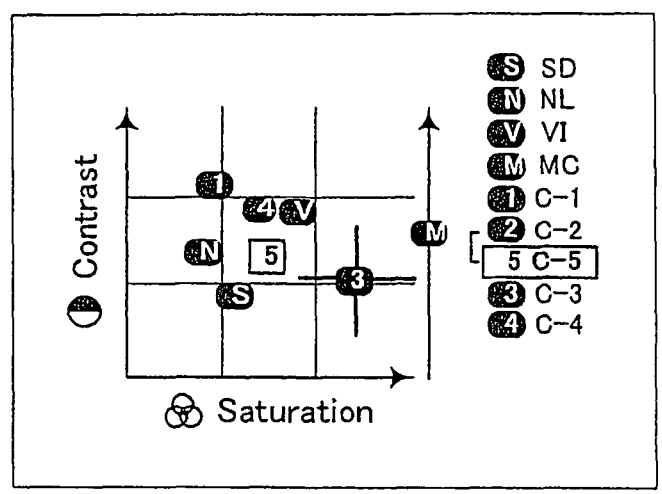
FIG. 44 is a figure showing an example of a map display screen.

And FIG. 44 is a figure showing an example of a map display screen when, for the custom picture adjustment file "3" (C 3), in addition to the parameter "contrast", the parameter "saturation" is also set automatically. Lines that extend both vertically and also horizontally are displayed through the "3" in the map display.

According to the embodiment explained above, the following beneficial operational effects are obtained.

(1) Since this electronic camera uses one or the other of the image quality adjustment algorithms [1] through [4] listed below as appropriate, accordingly it is possible to adjust the finished photographed image over a wider range, as compared with the case in which the parameters are only changed in a single image quality adjustment algorithm.

[1] standard
[2] neutral
[3] vivid
[4] monochrome (2) Since it is arranged for the electronic camera to be possible to change the standard parameter group that is applied to each quality adjustment algorithm, accordingly it is possible to adjust the finished photographed image very minutely.

(3) Since it is arranged for the electronic camera to be possible to store the parameter group after it has been changed, accordingly it is possible to improve the convenience of use from the point of view of the user, as compared to the case in which the changed parameter group disappears since it is not stored.

(4) Since, once a parameter group has been changed and stored, it is arranged for the electronic camera to be possible to change the parameter group and to store it for a second time, accordingly it is possible even further to enhance the convenience of use from the point of view of the user.

(5) Since it is arranged for the electronic camera to store the standard parameter group along with a parameter group after it has been changed, accordingly it is possible to return the settings to the standard parameter group by a reset operation. Thus the convenience of use from the point of view of the user is good, since it is possible to return to the standard parameter group in a simple manner. It should be understood that, if a custom picture adjustment file is subjected to this reset operation, the system returns to the values that are stored in the area for standard parameters of that custom picture adjustment file, in other words to the adjusted values when the custom picture adjustment file was registered.

(6) Since, when storing a parameter group after it has been changed (i.e. its changed values), in addition to the above described standard parameter group, it is arranged for the electronic camera to store the ID information that specifies the corresponding image quality adjustment algorithm, accordingly it is possible to perform storage sorted by image quality adjustment algorithm.

(7) Since it is arranged for the electronic camera to be chosen both the selection of an image quality adjustment algorithm among the image quality adjustment algorithms [1] through [4] (picture control) and the selection of a changed parameter group (custom picture control) upon similar list screens, (FIGS. 7 and 14), accordingly it is possible to choose the settings for the finished photographed image with a simple actuation.

(8) If no image quality adjustment algorithm that applies some parameter group is stored in the camera, then that parameter group is eliminated from the list display of FIG. 14. Due to this, it is possible to avoid the occurrence of a state of affairs in which, although a parameter group has been chosen, it is not possible to apply any image quality adjustment algorithm.

It should be understood that it would also be acceptable to arrange to display a warning message upon the liquid crystal monitor 21 to the effect that no image quality adjustment algorithm corresponding to that parameter group is stored in the camera.

(9) If, with a base picture adjustment file that includes an image quality adjustment algorithm being stored in the memory 20, some custom picture adjustment file that has been generated based upon that base picture adjustment file is also stored in the memory 20, then this base picture adjustment file is eliminated from the delete list of FIG. 30. Due to this, it is possible to avoid any danger of a custom picture adjustment file that cannot be used becoming present.

It should be understood that it would also be acceptable to arrange, before deleting such a base picture adjustment file, to display a warning message upon the liquid crystal monitor 21 to the effect that a custom picture adjustment file is about to be present that cannot be used.

(10) It is arranged to make it possible to add another image quality adjustment algorithm to the electronic camera, by recording the contents of a base picture adjustment file from the recording medium 27, in which the base picture adjustment file including the image quality adjustment algorithm for addition is stored, into the memory 20 within the camera. If the electronic camera to which the image quality adjustment algorithm has been added uses, as appropriate, either one of the image quality algorithms [1] through [4] that are used in normal image quality adjustment, or the image quality algorithm that has been added, then it is possible to adjust the finished photographic image within a wide range.

(11) Since [a3] the title of the image quality adjustment, [a10] the map information specifying the image quality adjustment, and [a5] the icon information are included in the basic picture adjustment file, accordingly, when adding an image quality adjustment algorithm to the electronic camera, it is possible to display the list screen for addition upon the liquid crystal monitor 21 in a manner that is easy to understand from the point of view of the user.

(12) Since it is arranged for the electronic camera to be possible to record upon the recording medium 27 the basic picture adjustment file, that includes [a11] the standard parameter group and [a12] the image quality adjustment algorithm, accordingly it is possible to supply the necessary information for image adjustment from the electronic camera to an external device in a simple and easy manner.

(13) It is arranged for the electronic camera to be possible to add to the electronic camera a parameter group that applies to an image quality adjustment algorithm by recording, from a recording medium 27 upon which a custom picture adjustment file that includes that parameter group for addition is stored, the contents of that custom picture adjustment file into the memory 20 within the camera. If the electronic camera to which this parameter group has been added is used for performing image quality adjustment by applying this parameter group that has been added to an image quality adjustment algorithm that is present within the camera, then it is possible to adjust the finished photographed image in a minute manner.

(14) Since it is arranged for the electronic camera to be capable of recording a custom picture adjustment file, that includes [b2] the image quality adjustment ID, [b5] the parameter group, and [b6] the standard parameter group, upon the recording medium 27, accordingly it is possible to supply the information that is needed for image adjustment from the electronic camera to an external device in a simple and easy manner.

(15) When performing actuation to change a parameter group that is applied to an image quality adjustment algorithm, then "quick adjust" is made possible, in which by actuating a single bar it is possible to control a plurality of parameters (contour accentuation, contrast, brightness, saturation, and hue) all together. As compared with the case in which actuation is performed individually for each of the parameters, it is possible to execute the changes in a simple manner.

(16) Since it is arranged for the electronic camera to be possible to choose "quick adjust" or an adjustment method in which actuation is performed to change each of the parameters individually, accordingly it is possible to adjust the parameter group with the adjustment method that the user prefers.

(17) Since, when "quick adjust" is performed after having performing individual change actuation for the parameter group, it is arranged to display a message upon the liquid crystal monitor 21 to the effect that those details that have been individually changed will become invalid (because they will be updated to the details set by the quick adjust), accordingly it is possible to reduce the fear that parameters that reflect the desires of the user will be undesirably changed.

It should be understood that it would also be acceptable, when actuation is performed to make an individual change on a parameter group after it has been subjected to "quick adjust", to arrange to display a message upon the liquid crystal monitor 21 to the effect that the details that have been changed by "quick adjust" are going to become invalid (because these set details are going to be updated due to the individual adjustment).

(18) It is arranged to display the characteristics of the image quality adjustment by a map display upon a two dimensional plane surface with two parameters of a group that is applied to the image quality adjustment algorithm being taken as the two axes, in which the corresponding parameter values are plotted. In particular, since the two axes are taken as being saturation and contrast, the characteristics of the image quality adjustment can be expressed in a manner that is easy to understand.

(19) Since a plurality of image quality adjustment algorithms (basic picture adjustments) and parameter groups (custom picture adjustments) are all shown upon the map in mutual correspondence, accordingly it is possible to express the differences between various image quality adjustments in a manner that is easy to understand.

(20) Since, if several plot positions are mutually overlapped, it is arranged to display a predetermined one thereof as a priority, accordingly the overlapping of a plurality of plot positions does not become troublesome, and it is possible to express the characteristics of the image quality adjustment in a manner that is easy to understand.

It should be understood that, apart from displaying only the subject of priority with a priority display, it would also be acceptable to arrange to provide a display from which it may be understood that a plurality of subjects are overlapped, by displaying the uppermost subject as a priority and by displaying the others as shadowed.

(21) Since it is arranged to display the member of the list that is in an upper position as a priority, or to display the member in the list that has been selected as a priority, accordingly it is possible to display the characteristics of image quality adjustment related to basic picture adjustment and custom picture adjustment that the user desires to know.

(22) Since it is arranged to specify only the contrast information when the image quality adjustment algorithm is "monochrome", accordingly it is possible to express the disparity with the other image quality adjustment algorithms ("standard", "vivid", and so on) in a manner that is easy to understand.

(23) Since, when a parameter (saturation or contrast) that corresponds to one of the two axes is set automatically (i.e. the electronic camera determines this parameter automatically from the image that is the subject of image quality adjustment processing), it is arranged to display this parameter as a line upon the map, accordingly it is also possible to display the characteristics of image quality adjustment during automatic setting in a manner that is easily understood.

It should be understood that, in this case when a line is displayed, it would also be acceptable to arrange to display a line of a length that corresponds to the permitted range for auto setting.

Variant Embodiment #1

It would also be acceptable to endow the electronic camera with a mode in which no image quality adjustment processing is performed upon the photographed image, and, rather, a basic picture adjustment file that includes the image quality adjustment algorithm selected by "picture control" is stored upon the recording medium 27 in correspondence with the file for the photographed image.

According to this variant embodiment #1, the photographed image file and the basic picture adjustment file that have been stored upon the recording medium 27 are both read out by an external device (for example, a personal computer), and image adjustment processing for that photographed image is performed by the external device applying the parameter group that is recorded in the basic picture adjustment file to the image quality adjustment algorithm in the basic picture adjustment file.

Variant Embodiment #2

It would also be acceptable to endow the electronic camera with a mode in which no image quality adjustment processing is performed upon the photographed image, and, rather, a custom picture adjustment file that is selected by "custom picture control" is stored upon the recording medium 27 in correspondence with the file for the photographed image.

According to this variant embodiment #2, the photographed image file and the custom picture adjustment file that have been stored upon the recording medium 27 are both read out by an external device (for example, a personal computer), and image adjustment processing for that photographed image is performed by the external device applying the parameter group that is recorded in the custom picture adjustment file to the image quality adjustment algorithm that is specified by the ID information in the custom picture adjustment file. In this case, the image quality adjustment algorithm that is specified by the ID information should be stored in advance in that external device.

Variant Embodiment #3

Even though, on the list screens of FIGS. 7, 10, 14, 16, 20, 21, 24, 27, 30, and 33, all of titles, icons, and abbreviations are explicitly displayed, it would also be acceptable to arranged to display only one or more thereof.

Variant Embodiment #4

Although an example has been explained in which the basic picture adjustment files and the custom picture adjustment files are read out from the recording medium 27, it would also be acceptable to arrange to acquire them by communication with an external device (either by cable or by wireless). Moreover, other than storing the basic picture adjustment files and the custom picture adjustment files upon the recording medium 27, it would also be acceptable to arrange for it to be possible to send these basic picture adjustment files and custom picture adjustment files to an external device by communication (either by cable or by wireless).

Variant Embodiment #5

The number of basic picture adjustments (image adjustment algorithms) possessed by the electronic camera, the number of image adjustment algorithms that can be added from the exterior, and the number of areas for custom picture adjustment (C 1 through C 8) are not limited to the values described above, and may be changed as appropriate.

The above explanation is only an example, and is not to be considered as being limitative of the structure of the embodiments described above in any way.

What is claimed is:

1. An electronic camera, comprising:
    an image processing unit, on which more than two different types of image quality adjustment algorithms are installed, that performs image quality adjustment by utilizing the image quality adjustment algorithms;
    a parameter setting unit that sets a plurality of adjustment parameters used for performing the image quality adjustment by utilizing the image quality adjustment algorithms;
    a display device; and
    a display control unit that controls the display device, wherein:
    each of the image quality adjustment algorithms is decided by a combination of values of the plurality of adjustment parameters set by the parameter setting unit, and
    the display control unit controls so as to:
        display, upon the display device, a two dimensional coordinate plane with two selected parameters, which were selected by a user among the plurality of adjustment parameters, being shown along two axis respectively, and
        further display on the two dimensional coordinate plane a plurality of first marks specifying names of the plurality of image quality adjustment algorithms respectively at a time at each of positions determined by values of the two selected parameters for each of the plurality of image quality adjustment algorithms.

2. An electronic camera according to claim 1, wherein the two selected parameters are a parameter for changing contrast of an image and a parameter for changing saturation of the image.

3. An electronic camera according to claim 1, wherein, if a plurality of the first marks to be displayed on the two dimensional coordinate plane become overlapped, the display control unit displays any one of the first marks on the two dimensional coordinate plane.

4. An electronic camera according to claim 3, wherein the display control unit displays upon the display device a plurality of second marks specifying names of the plurality of image quality adjustment algorithms respectively in a list form together with the two dimensional coordinate plane.

5. An electronic camera according to claim 4, wherein the display control unit displays on the two dimensional coordinate plane the first mark specifying the image quality adjustment algorithm that has been commanded by the user on the list.

6. An electronic camera according to claim 1, wherein, when at least one of the two selected parameters has been set automatically, the display control unit displays an index showing the automatic setting in addition to the first mark on the two dimensional coordinate plane.

7. An electronic camera according to claim 1, further comprising:
    an obtaining device that obtains from an external device an external image quality adjustment algorithm which is different from any of the image quality adjustment algorithms installed on the image processing unit,
    wherein the display control unit displays a third mark specifying the external image quality adjustment algorithm on the two dimensional coordinate plane together with the plurality of first marks.

* * * * *